(12) United States Patent
Wolfson et al.

(10) Patent No.: US 12,710,396 B2
(45) Date of Patent: Aug. 18, 2026

(54) SENSOR ASSEMBLY WITH WICKING MEMBER FOR LIQUID JUNCTION WET UP

(71) Applicant: Siemens Healthcare Diagnostics Inc., Tarrytown, NY (US)

(72) Inventors: Mark Wolfson, Wellesley, MA (US); Christian Pudduck, Norfolk, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 177 days.

(21) Appl. No.: 18/718,166

(22) PCT Filed: Dec. 13, 2022

(86) PCT No.: PCT/US2022/081408
§ 371 (c)(1),
(2) Date: Jun. 10, 2024

(87) PCT Pub. No.: WO2023/122446
PCT Pub. Date: Jun. 29, 2023

(65) Prior Publication Data

US 2025/0044252 A1 Feb. 6, 2025

Related U.S. Application Data

(60) Provisional application No. 63/265,740, filed on Dec. 20, 2021.

(51) Int. Cl.
*G01N 27/40* (2006.01)
*G01N 27/30* (2006.01)
(Continued)

(52) U.S. Cl.
CPC ........... *G01N 27/40* (2013.01); *G01N 27/301* (2013.01); *G01N 27/327* (2013.01); *G01N 27/4035* (2013.01)

(58) Field of Classification Search
CPC .... G01N 27/40; G01N 27/327; G01N 27/301; G01N 27/4035; G01N 27/333; G01N 27/33
See application file for complete search history.

(56) References Cited

U.S. PATENT DOCUMENTS 5,980,830 A 11/1999 Savage et al.
9,217,724 B2 12/2015 Trapp et al.
(Continued)

FOREIGN PATENT DOCUMENTS

JP S4851695 A 7/1973
JP 04190152 A * 7/1992 ............. G01N 27/30
(Continued)

OTHER PUBLICATIONS

EPO machine-generated English language translation of JP 04190152 A, patent published Jul. 8, 1992 (Year: 1992).*
(Continued)

*Primary Examiner* — Alexander S Noguerola

(57) ABSTRACT

A sensor assembly for a bodily fluid analyzer includes a reference electrode container containing a reference electrode, a membrane capable or configured to be in fluid communication with the reference electrode container; and a wicking member capable or configured to be in fluid communication with the reference electrode container. The wicking member is configured to draw a reference fluid contained in the reference electrode container towards the membrane when the membrane and the wicking member are exposed to the reference fluid.

28 Claims, 11 Drawing Sheets

(51) Int. Cl.
*G01N 27/327* (2006.01)
*G01N 27/403* (2006.01)

(56) References Cited

U.S. PATENT DOCUMENTS

| | | | | |
|---|---|---|---|---|
| 2002/0188224 | A1 | 12/2002 | Roe et al. | |
| 2002/0189944 | A1 * | 12/2002 | Connelly | G01N 27/401 204/435 |
| 2006/0200044 | A1 | 9/2006 | Freeman et al. | |
| 2010/0198108 | A1 | 8/2010 | Alden | |
| 2012/0190589 | A1 | 7/2012 | Anderson et al. | |
| 2018/0306831 | A1 | 10/2018 | Hatamian | |
| 2021/0131993 | A1 | 5/2021 | Buie et al. | |

FOREIGN PATENT DOCUMENTS

| | | | |
|---|---|---|---|
| JP | 2003501656 | A | 12/2000 |
| JP | 2010517032 | A | 7/2008 |
| JP | 2012255813 | A | 12/2012 |
| JP | 2019113316 | A | 7/2019 |
| JP | 2014528062 | A | 7/2024 |
| WO | 02103344 | A1 | 12/2002 |
| WO | 2014159070 | A1 | 10/2014 |
| WO | 2020005692 | A1 | 1/2020 |
| WO | 2020005697 | A1 | 1/2020 |

OTHER PUBLICATIONS

International Search Report and Written Opinion of International Application No. PCT/US2022/081408 dated May 10, 2023.

* cited by examiner 18
52
132
142c
142b
56
50
144
142d
156
142a
130
154
34
100a
40
32
108
100b
150
108
102
112
42
152
116
114
102
54
116
110

SENSOR ASSEMBLY WITH WICKING MEMBER FOR LIQUID JUNCTION WET UP

CROSS REFERENCE TO RELATED APPLICATIONS/INCORPORATION BY REFERENCE STATEMENT

The subject application claims benefit under 35 USC § 119 (e) of U.S. Provisional Application No. 63/265,740, filed Dec. 20, 2021. The entire contents of the above-referenced patent application(s) are hereby expressly incorporated herein by reference.

BACKGROUND

Modern-day blood analyzers are designed to use a small volume of a patient's blood for measurement. To achieve this, the analyzers transport the blood from a sampling device to sensors and ultimately to a waste container. However, the sensors used in conventional blood analyzers are susceptible to measurement errors due to presence or formation of gas bubbles near the sensor.

The sensors used for these measurements are ion-specific or ion-selective electrodes (ISE). These sensors are membrane-based electrochemical transducers that respond to a specific ion. Biosensors are used in analyzers in the traditional clinical laboratory, but also in point-of-care testing devices. Biosensors convert the biochemical signal into an electrical signal.

Electrolytes are determined by potentiometric measurements, a form of electrochemical analysis. In potentiometry, the potential or voltage is measured between the two electrodes in a solution. These potentials can also be produced when a metal and ions of that metal are present in a solution. By using a membrane semipermeable to the ion, different concentrations of the ion can be separated. These systems use a reference electrode and a measuring electrode. A constant voltage is applied to the reference electrode; the difference in voltage between the reference and measuring electrodes is used to calculate the concentration of the ion in solution.

Typical devices for measuring the ionic content of solutions include a reference electrode and a separate potentiometric or "working" electrode. When these are immersed in a volume of solution to be analyzed (i.e., test solution), the reference and working electrodes together constitute an electrochemical cell. The reference electrode provides a constant potential with respect to the potential detected by the working electrode from the test solution. The potential difference (i.e., voltage) across the cell (i.e., the potential difference between the working and reference electrodes) is proportional to the activity of the ion(s) in the test solution. This in turn is related to the concentration of the ion in the test solution, such that the concentration can be directly determined as a function of the voltage measured across the reference and working electrodes.

The electrolyte may be confined in an electrolyte reservoir behind a membrane which permits ion transport while restraining flow of the solution to be analyzed and the electrolyte itself. Thus, the electrolyte contacts the test solution at a constrained-flow liquid junction, which allows flow of ions by diffusion but not by convection. The membrane defines the region of the constrained-flow liquid junction. Prior art reference electrodes typically are a silver chloride coated silver wire dipped into an electrolyte solution of concentrated potassium chloride (or some equivalent formulation) contained in an electrolyte reservoir. Thus, reference electrodes and the electrolyte solution are contained in the electrolyte reservoir.

In a typical operational arrangement, the working and reference electrodes are sequentially exposed to the test solution (e.g., a blood sample) and a calibration solution(s) (the calibration solution(s) may follow or precede the blood sample). The calibration solution(s) contain a known concentration of the ions to be measured. By comparison of the potential difference between the reference and working electrodes responsive to the sample and the reagent, an accurately calibrated value can be determined for the concentration of the ion in the blood sample.

To prevent salt crystallization and precipitation at the membrane during storage and transport of the sensor assembly, a plug, cap, or film may be employed to keep the membrane sealed from the electrolyte during storage. When ready to be used, the plug may be moved to expose the membrane to the electrolyte solution (e.g., a salt solution) so that the electrolyte reservoir can "wet-up" to its operational functionality. However, a gas bubble may form between the electrolyte solution and the membrane, thereby preventing the membrane from becoming "wet up." Additionally, once the membrane has "wet up," gas bubbles may form over the membrane during use resulting in an unfavorable change or loss of connection to the reference solution, which negatively affects the flow of ions across the membrane and therefore results in errors of the measured values. The gas bubbles adhering to the membrane or in the vicinity of the membrane prevent the electrolyte solution from adequately contacting or completely covering the membrane, and therefore negatively affect maintaining and/or creating a proper liquid junction at the membrane region, resulting in a higher resistance and thus a higher (erroneous) voltage measurement. Thus, gas bubbles forming on or near the membrane during "wet-up" disadvantageously result in measurement errors of the sensor assembly.

To this end, a need exists for a sensor assembly with a reference electrode structure which can be shipped dry, thus providing a long shelf life, but which can be "wet-up" for use without bubble formation. In particular, a need exists for a sensor assembly that avoids and/or reduces gas bubbles in the area of the sensor membrane, and thus improves the maintenance and/or creation of a liquid junction across the membrane region which eliminates and/or reduces measurement errors. It is to such a sensor assembly that the inventive concepts disclosed herein are directed.

BRIEF DESCRIPTION OF THE SEVERAL VIEWS OF THE DRAWINGS

To assist those of ordinary skill in the relevant art in making and using the inventive concepts disclosed herein, reference is made to the appended drawings and schematics, which are not intended to be drawn to scale, and in which like reference numerals are intended to refer to the same or similar elements for consistency. For purposes of clarity, not every component may be labeled in every drawing. Certain features and certain views of the figures may be shown exaggerated and not to scale or in schematic in the interest of clarity and conciseness. In the drawings.

DETAILED DESCRIPTION

Figure 1:
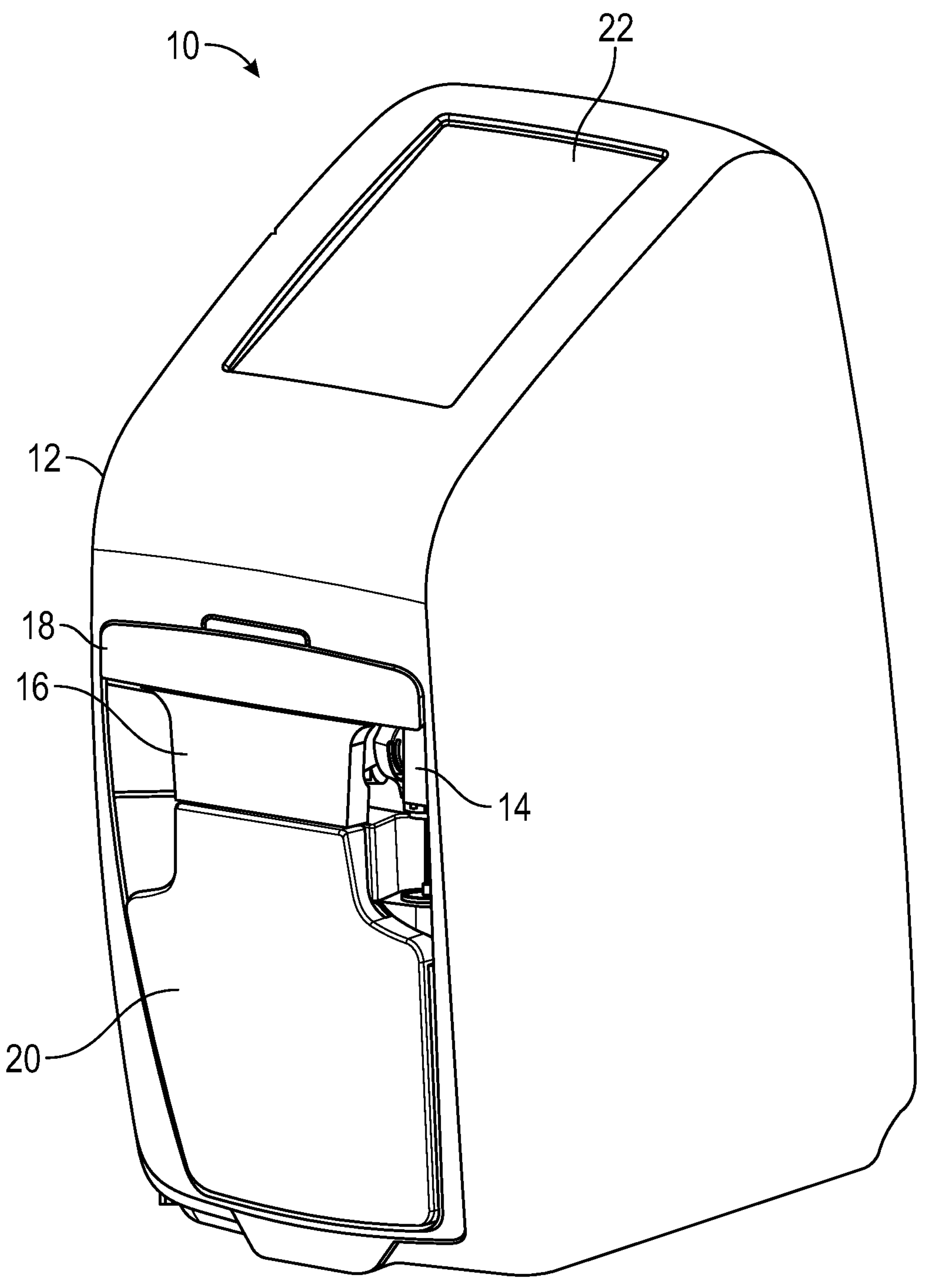
FIG. 1 is a perspective view of a blood analyzer with a sensor assembly constructed in accordance with the inventive concepts disclosed herein.

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. The language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined, scientific and technical terms used in connection with the presently disclosed and claimed inventive concept(s) shall have the meanings commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references cited and discussed throughout the present specification. The nomenclatures utilized in connection with, and the laboratory procedures and techniques of, analytical chemistry, synthetic organic chemistry, and medicinal and pharmaceutical chemistry described herein are those well-known and commonly used in the art. Standard techniques are used for chemical syntheses and chemical analyses.

All the articles, compositions and/or methods disclosed and claimed herein can be made and executed without undue experimentation, given the present disclosure. While the articles, compositions and methods of the inventive concept(s) have been described in terms of particular embodiments, it will be apparent to those of skill in the art that variations may be applied to the articles, compositions and/or methods and in the steps or in the sequence of steps of the methods described herein without departing from the concept, spirit and scope of the inventive concept(s). All such similar substitutes and modifications apparent to those skilled in the art are deemed to be within the spirit, scope, and concept of the inventive concept(s) as defined by the appended claims.

As utilized under the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the inherent variation of error for the device, the method being employed to determine the value, or the variation that exists among the study subjects.

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

As used herein, the term "sample" and variations thereof is intended to include biological tissues, biological fluids, chemical fluids, chemical substances, suspensions, solutions, slurries, mixtures, agglomerations, tinctures, slides, powders, or other preparations of biological tissues or fluids, synthetic analogs to biological tissues or fluids, bacterial cells (prokaryotic or eukaryotic), viruses, single-celled organisms, lysed biological cells, fixed biological cells, fixed biological tissues, cell cultures, tissue cultures, genetically engineered cells and tissues, genetically engineered organisms, and combinations thereof, for example.

The term "wet-up" as used herein will be understood to refer to the hydration process (e.g., of a membrane) from installation of a sensor in a fluid analyzer to a point at which a stable signal is obtained out of calibration reagents (e.g., a reference fluid). A stable signal may be obtained when a liquid junction is formed and maintained. Gas bubbles formed at or near the membrane during wet-up may negatively affect the stability of the signal by hindering formation or maintenance of the liquid junction. Thus, improving wet-up as described herein includes obtaining and/or maintaining a stable signal and hence a liquid junction at the membrane free of or with reduced gas bubbles.

The phrase "capable or configured to be in fluidic communication" as used herein refers to a direct or indirect fluidic communication between two elements/compartments that allows for flow of fluid therebetween. In addition, the phrase "capable or configured to be in fluidic communication" includes instances where a flow point between two elements/compartments may be sealed or otherwise plugged, but the two elements/compartments are capable of having fluid flow therebetween upon puncture, piercing, or other removal of the seal/plug formed therein or therebetween.

In the following detailed description of embodiments of the inventive concept, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed and/or claimed herein generally relate to a sensor assembly for a bodily fluid analyzer. The sensor assembly includes a reference electrode container containing a reference electrode; a membrane capable or configured to be in fluid communication with the reference electrode container; and a wicking member capable or configured to be in fluid communication with the reference electrode container. The wicking member is configured to draw a reference fluid contained in the reference electrode container towards the membrane when the membrane and the wicking member are exposed to the reference fluid (i.e., when the membrane and the wicking member are in fluid communication with the reference electrode container). When the membrane and the wicking member are not exposed to (i.e., sealed from) the reference fluid, the membrane and the wicking member are not in fluid communication with the reference electrode container. The membrane and the wicking member may be positioned in the reference electrode container, or may be positioned external to but in fluid communication with the reference electrode container.

In another aspect, the inventive concepts disclosed and claimed herein generally relate to a fluid analyzer including a sample receiving assembly having a sample probe with a fluid inlet and a fluid outlet, a fluid waste assembly; and a sensor assembly in fluid communication with the sample receiving assembly, and the fluid waste assembly. The sensor assembly includes a reference electrode container containing a reference electrode; a membrane capable or configured to be in fluid communication with the reference electrode container; and a wicking member capable or configured to be in fluid communication with the reference electrode container. The wicking member is configured to draw a reference fluid contained in the reference electrode container towards the membrane when the membrane and the wicking member are exposed to the reference fluid (i.e., when the membrane and the wicking member are in fluid communication with the reference electrode container). When the membrane and the wicking member are not exposed to (i.e., sealed from) the reference fluid, the membrane and the wicking member are not in fluid communication with the reference electrode container. The membrane and the wicking member may be positioned in the reference electrode container, or may be positioned external to but in fluid communication with the reference electrode container.

In another aspect, the inventive concepts disclosed and claimed herein generally relate to a method of forming a sensor assembly for a bodily fluid analyzer. The method includes positioning a membrane in such a manner so as to be capable of fluid communication with a reference electrode container, wherein the reference electrode container contains a reference electrode and is configured to contain a reference fluid, and positioning a wicking member to draw the reference fluid towards the membrane when the membrane and the wicking member are exposed to the reference fluid. The membrane and the wicking member may be positioned inside or outside the reference electrode container.

Described herein, and shown in the accompanying figures, are several non-limiting embodiments of apparatus of the presently claimed and disclosed inventive concepts which may be used in association with collection syringes and fluid sample analyzers for removing bubbles of air or other gases from a fluid sample for analysis by a fluid sample analyzer. The fluid sample is generally from a biological source. A "fluid" refers to any substance that has no fixed shape and yields easily to external pressure.

Figure 2:
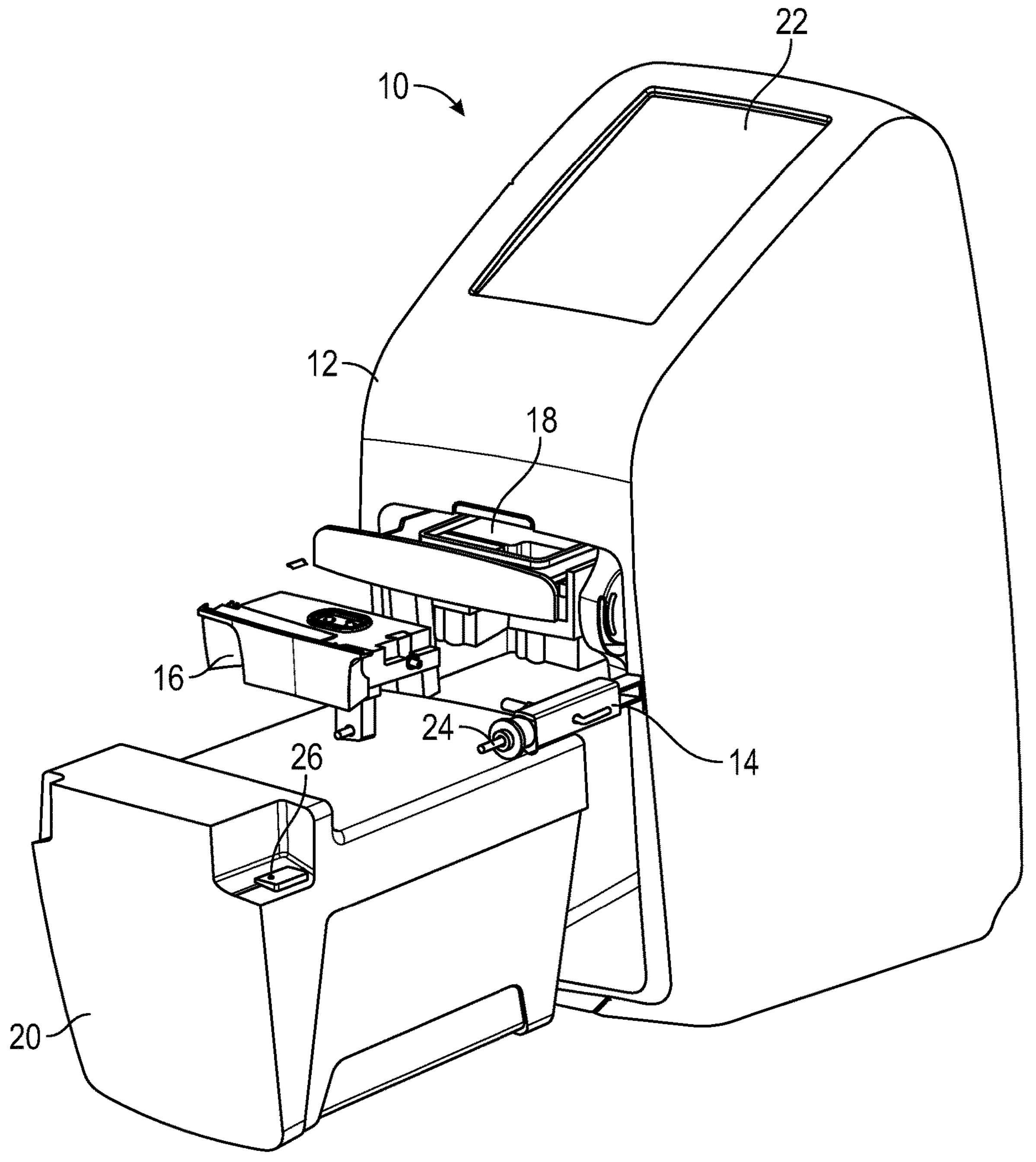
FIG. 2 is an exploded, perspective view of the blood analyzer of FIG. 1 showing the sensor assembly removed from the blood analyzer.

Referring now to the drawings, and more particularly to FIGS. 1 and 2, an exemplary blood analyzer 10 for analyzing one or more samples for one or more target analytes is illustrated. In certain embodiments, the blood analyzer 10 is a point of care analyzer or a blood analyzer as known in the art. Exemplary point of care analyzers are available from Siemens Healthcare Diagnostics, Inc. and are sold under the trademarks: RAPIDLab 1200, RapidLab 348EX, RAPIDPoint 500, RAPIDLab 248/348, RAPIDPoint 400/405, and RAPIDPoint 340/350 Systems. Other commercially available point of care instruments are available from Roche Molecular Systems Inc., Medica Corp., Radiometer Medical (Denmark), and Nova Biomedical Corp.

The blood analyzer 10 includes an enclosure 12 for housing and supporting multiple sample analyzing components and/or modules. These components may include a sample receiving assembly 14, a fluidic tubing assembly 16, a sensor assembly 18, and a reagent assembly 20. The enclosure 12 may also support a display screen 22 for illustrating the progress of a test.

The fluid sample to be introduced to the blood analyzer 10 may comprise any biological material taken from a subject, for example, such as a bodily fluid, infection, or abscess collected from the subject by suitable methods and devices known in the art. Bodily fluids include but are not limited to urine, whole blood, blood serum, blood plasma, saliva, cerebrospinal fluid, pleural fluid, dialysate fluid, nasopharyngeal swabs, vaginal swabs, tears, tissues, and the like. The sample may further include any suitable buffers, diluents, or the like as needed or desired for the particular sample. In particular embodiments, the sample comprises a blood sample, which may be: a whole blood sample comprising plasma and whole blood cells; a plasma sample; or a serum sample. In a particular embodiment, the sample comprises a whole blood sample. The whole blood sample may comprise red blood cells, platelets and the like. In other embodiments, the blood sample comprises a plasma sample. To obtain the plasma sample, the sample may have been treated to remove a plurality of the whole blood cells using known methods and components such as centrifugation or commercially available porous membranes.

The sample receiving assembly 14 is adapted for introducing a liquid sample from a transport container (not shown) to the sensor assembly 18 for analysis. An example of a sample receiving assembly 14 is disclosed in U.S. Pat. No. 10,928,409, which is hereby expressly incorporated herein by reference. In one example, the sample receiving assembly 14 includes a sample probe 24 that may be rotatable to selected positions so the sample probe 24 can receive a fluid sample from different types of sample transport containers. Examples of sample transport containers are syringes, vacutainers, and capillary tubes (not shown). The sample probe 24 may also be oriented in a stand-by mode (e.g., vertically) to seal against a fluid outlet 26 of the reagent assembly 20 whereby the sample receiving assembly 14 is used to transport fluid from the reagent assembly 20 to the sensor assembly 18.

The reagent assembly 20 holds a plurality of reagent fluids used in the test. The reagents may be provided in reservoirs, such as sealed bags or bottles (not shown). The reagent assembly 20 may comprise one or several reservoirs pre-filled with process liquids (as known to a person skilled in the art: QC1, QC2, QC3, CRL3 (S1940), CRL2 (S1930), RINSE/CAL1 (S1920)) having a known composition. The skilled person will appreciate that other chemicals may be provided dependent on the exact test required.

The reagent assembly 20 may include a rubber teat (not shown) defining the fluid outlet 26, for example, such that when brought into sealing engagement with sample receiving assembly 14, the reagent assembly 20 is in fluid communication with the sensor assembly 18 enabling reagent fluid to flow from the reagent assembly 20 to the sensor assembly 18. The reagent assembly 20 can be integrated as part of the blood analyzer 10 or may otherwise be configured to be removable/disposable.

The sensor assembly 18 includes sensors, which are used to contact a fluid sample. The sensor assembly 18 may be integrated into the blood analyzer 10 or may otherwise be a modular unit that is removable/disposable. The sensor assembly 18 may be in direct or indirect communication with a computing unit (not shown) which may collect, store, and analyze analytical test results from the sensors according to known methods. After delivery of a fluid sample to the sensor assembly 18, the blood analyzer 10 may introduce the fluids from the reagent assembly 20 and prepare the blood analyzer 10 for introduction of a subsequent fluid sample.

Referring now to FIGS. 3-14, the sensor assembly 18 is illustrated detached from the enclosure 12 of the blood analyzer 10. In one non-limiting embodiment, the sensor assembly 18 includes a housing 30 (FIGS. 3-13), at least one sensor 32 (FIGS. 3, 9 and 10), a reference electrode 34 (FIG. 12), a reference fluid 36 (FIGS. 12, 13A, 13B, 14A and 14B), a membrane 150 defining a region of a liquid junction 38 (FIGS. 13A-B and 14A-B), a seal, such as a plug 40 (FIGS. 13A and 13B) or a pierceable barrier 170 (FIGS. 14A and 14B), and a wicking member 42 (FIGS. 13A-B and 14A-B).

The housing 30 is configured to define a fluid inlet 44, a fluid outlet 46, and a fluid flow path 48 extending between the fluid inlet 44 and the fluid outlet 46. The housing 30 has a sensor containment space 50 (also referred to as a sensor container 50) and a reference electrode containment space 52 (also referred to as a reference electrode container 52) separated from one another. The housing 30 supports various components for conducting chemical (such as electrochemical) assays on a fluid sample.

Figure 3:
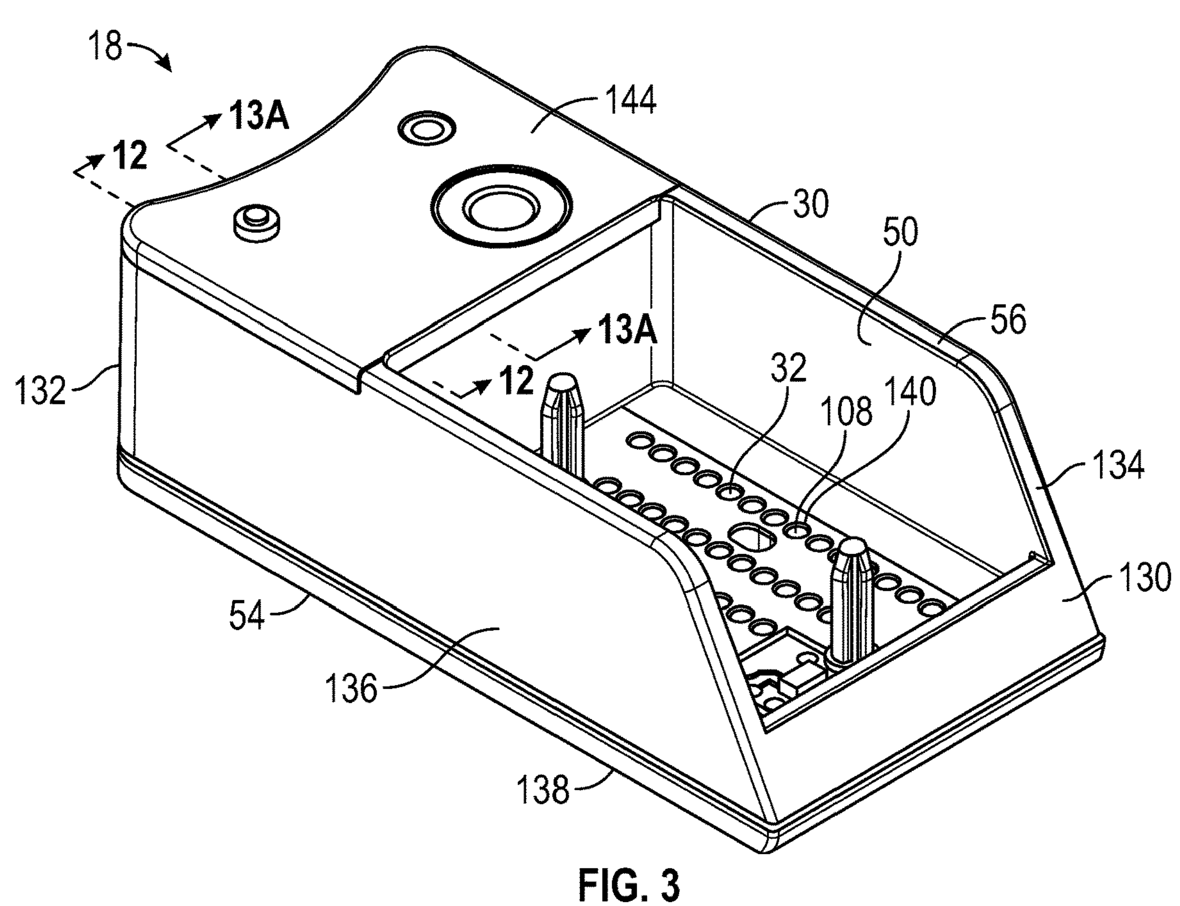
FIG. 3 a top perspective view of the sensor assembly.
Figure 4:
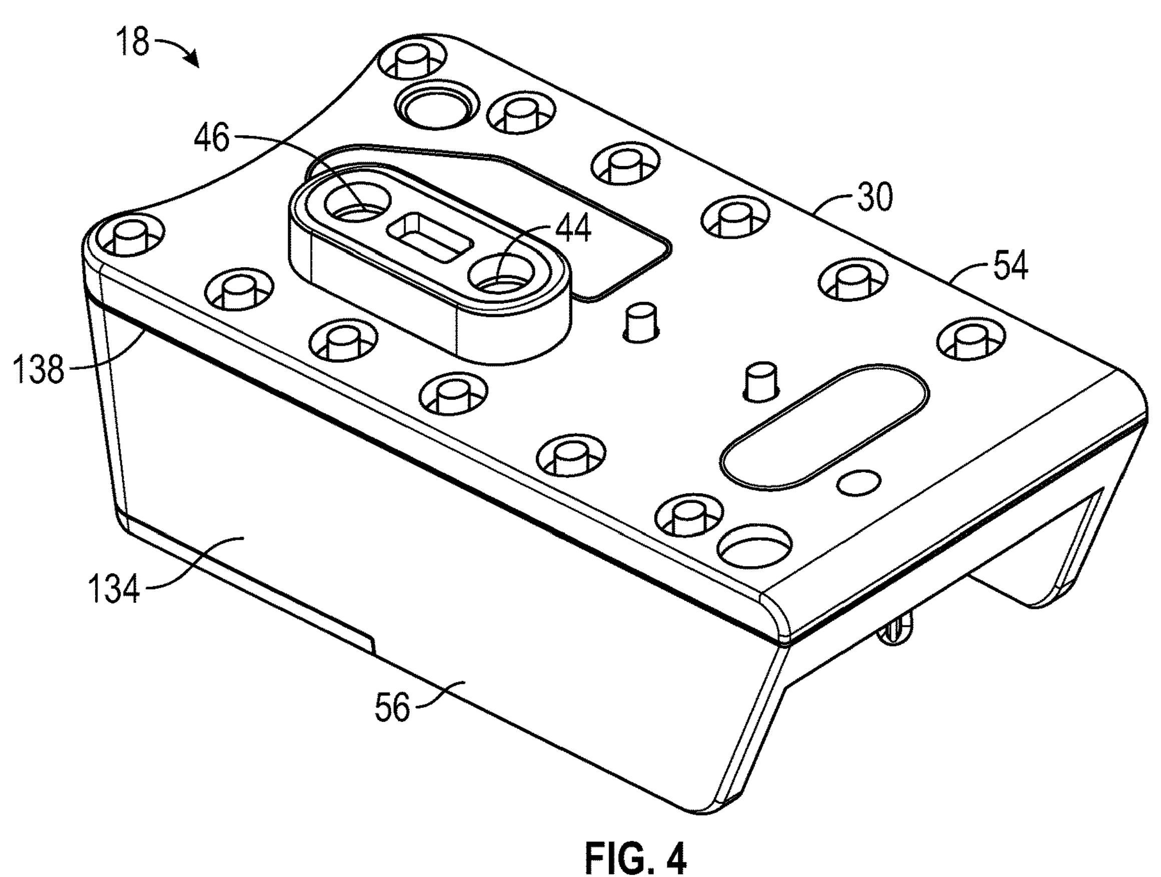
FIG. 4 is a bottom perspective view of the sensor assembly of FIG. 3.
Figure 5:
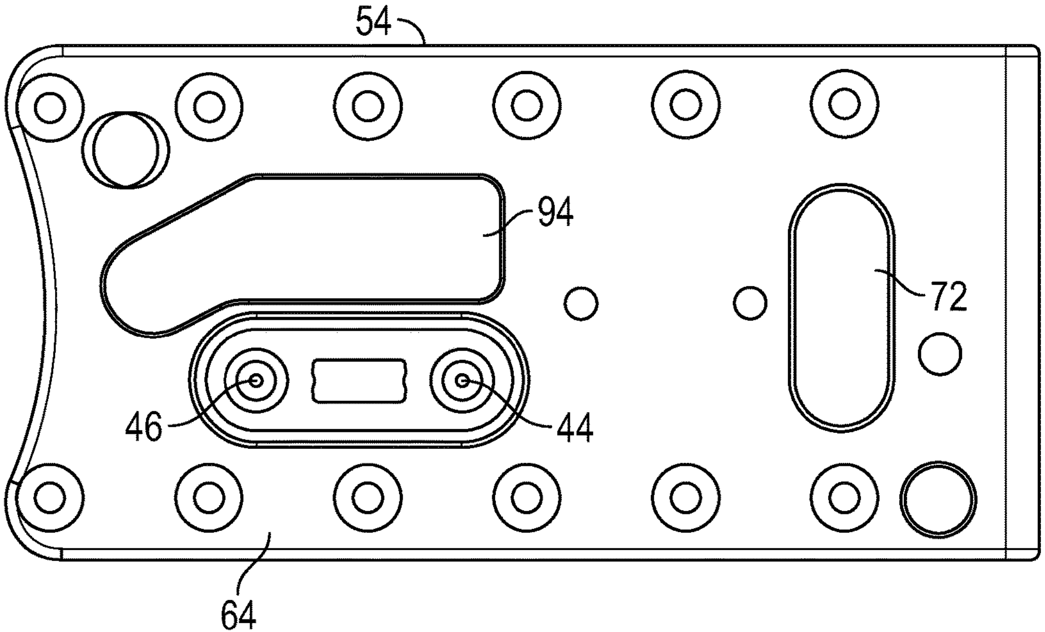
FIG. 5 is a bottom plan view of the sensor assembly of FIG. 3.

As shown in FIG. 3, in one non-limiting embodiment, the housing 30 is illustrated as being substantially rectangular in shape. However, a person having ordinary skill in the art should readily appreciate that the housing 30 can be any shape capable of accomplishing the presently disclosed and/or claimed inventive concept(s), including, without limitation, circular, triangular, square, pentagonal, hexagonal, heptagonal, octagonal, nonagonal, decagonal, or any polygonal shape. Further, the housing 30 may be constructed of any suitable materials including opaque and/or transparent and/or translucent material(s), including, without limitation, synthetic and/or naturally-occurring or derived polymers (both organic and/or inorganic), such as, by way of example only, thermoplastic polymer(s), thermoset polymer(s), elastomer(s), and/or synthetic fiber(s) such as low-density polyethylene, high density polyethylene, polystyrene, polyvinylchloride, styrene butadiene, polyacrylics, polyvinyl acetate, acrylic, acrylic acid, and acrylate polymers, and combinations thereof.

Figure 12:
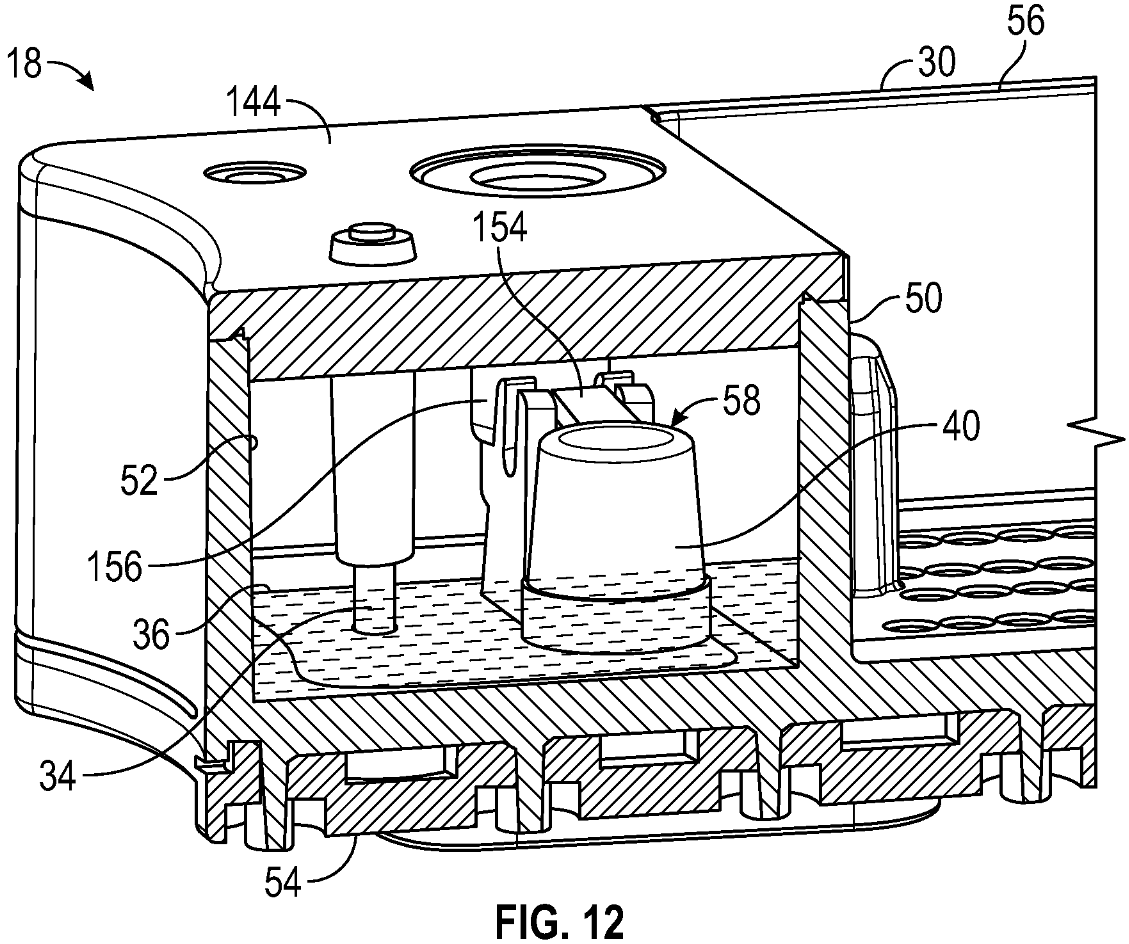
FIG. 12 is a sectional view taken along line 12-12 of FIG. 3 illustrating a reference electrode containment space.

The housing 30 may be constructed of a number of different components assembled to one another. In one non-limiting embodiment of the presently disclosed and/or claimed inventive concept(s), the housing 30 includes a base 54, a cover 56, and a plug assembly 58 (FIG. 12). The base 54 serves as a substrate for an integrated analyte detection system which may include electrochemical systems. In one non-limiting embodiment and with reference to FIGS. 5 and 6, the base 54 has a top side 62 and a bottom side 64. The top side 62 allows and/or facilitates the securement of additional components to the base 54. The base 54 may include the fluid inlet 44 of the housing 30. The fluid inlet 44 extends through the base 54 from the bottom side 64 to the top side 62 and intersects the fluid flow path 48 (FIGS. 13A, 13B) of the fluid sample.

In one non-limiting embodiment, the base 54 may define a portion of the fluid flow path 48. More particularly, the fluid inlet 44 may intersect one end of a groove 66 (FIG. 6) that extends along the top side 62 of the base 54. At another end of the groove 66, a port 68 (FIG. 7) extends from the top side 62 to the bottom side 64 where the port 66 intersects one end of a crossover groove 70 (FIG. 7) formed on the bottom side 64 of the base 54. The crossover groove 70 extends along a portion of the bottom side 54 of the base 54. The crossover groove 70 may be covered with a cover 72 (FIG. 5) to define a crossover channel. A port 74 (FIG. 7) extends from another end of the crossover groove 70 from the bottom side 64 to the top side 62 where the port 74 intersects one end of a groove 76 (FIG. 6) that extends along the top side 62 of the base 54. The groove 76 may extend in a parallel relationship to the groove 66.

Figure 6:
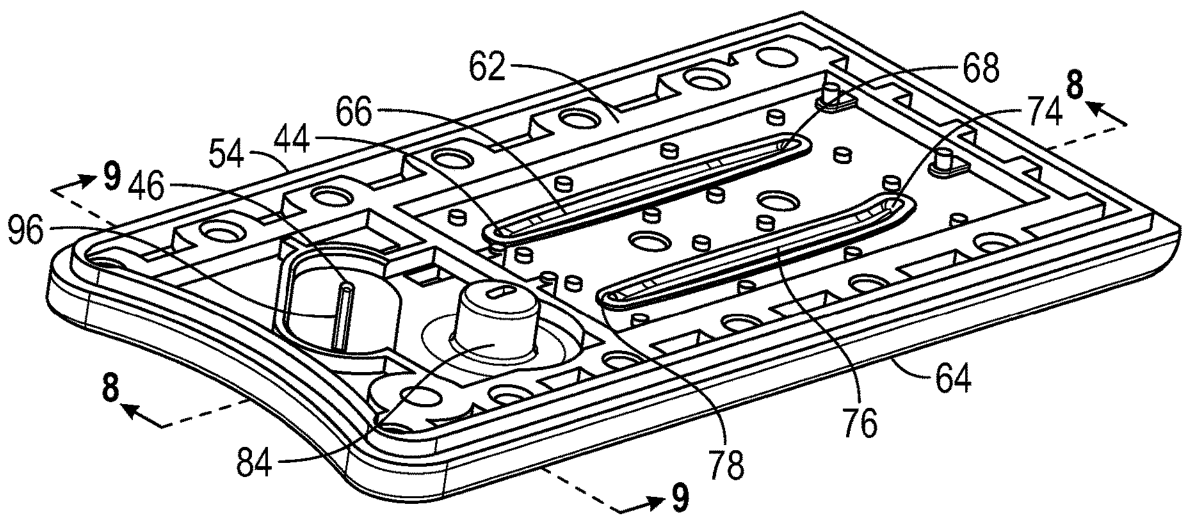
FIG. 6 is top perspective view of a base of a housing of the sensor assembly.
Figure 7:
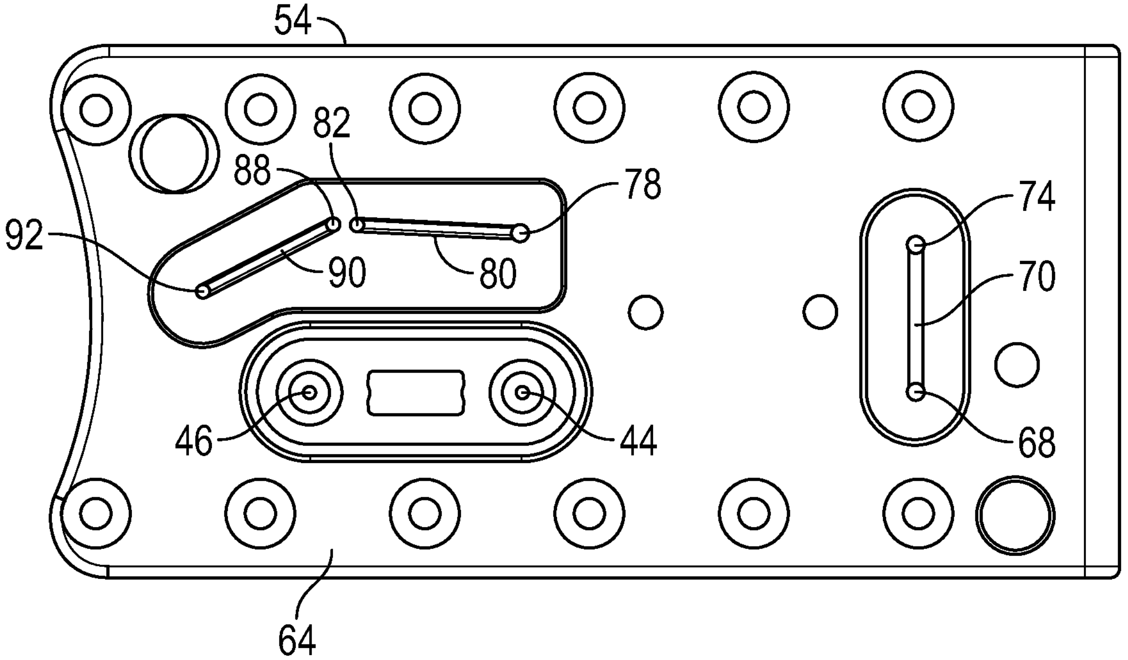
FIG. 7 is a bottom plan view of the base of FIG. 6 with a pair of covers removed for clarity.
Figure 8:
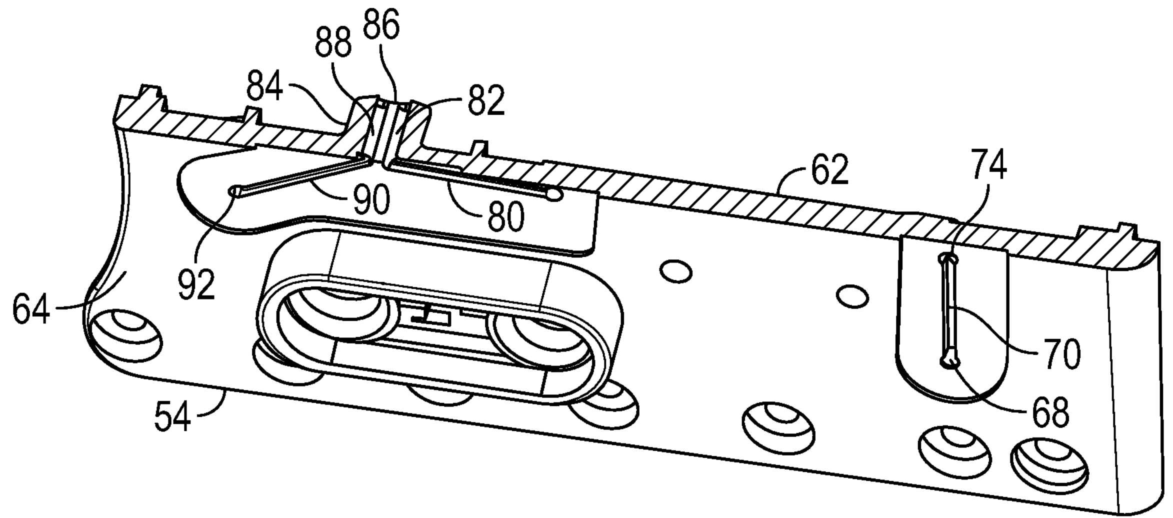
FIG. 8 is a sectional view taken along line 8-8 of FIG. 6.

At another end of the groove 76, a port 78 (FIGS. 7 and 8) extends from the top side 62 to the bottom side 64 where the port 78 intersects one end of a groove 80 formed on the bottom side 64 of the base 54. The groove 80 extends along a portion of the bottom side 64 where another end of the groove 80 intersects a port 82 (FIGS. 7 and 8) extending from the bottom side 64 to the top side 62. The top side 62 of the base 54 within the reference electrode containment space 52 includes a projection 84 (FIGS. 6 and 8). The port 82 extends to a distal end of the projection 84. The distal end of the projection 84 has a slot 86 and the port 82 intersects one end of the slot 86 (FIGS. 6 and 7). Another end of the slot 86 intersects one end of a port 88 extending from the top side 62 to the bottom side 64 so the port 82, the slot 86, and the port 88 define a substantially U-shaped flow path (FIG. 8).

The port 88 intersects one end of a groove 90 (FIG. 8) formed on the bottom side 64 of the base 54. The groove 90 extends along a portion of the bottom side 64 where another end of the groove 90 intersects a port 92 (FIG. 9) extending from the bottom side 64 to the top side 62. The grooves 80 and 90 may be covered with a cover 94 (FIG. 5) to define a pair of channels.

The port 92 intersects one end of a groove 96 (FIG. 9) that extends along a portion of the top side 62 where another end of the groove 96 intersects the fluid outlet 46, which extends from the top side 62 to the bottom side 64 of the base 54.

Figures 9, 10:
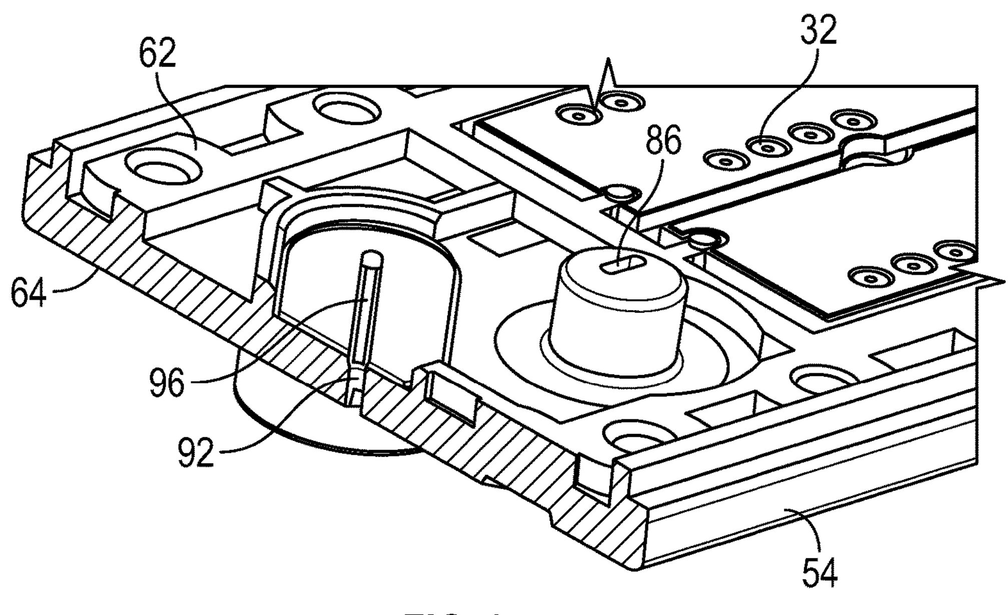
FIG. 9 is a sectional view of the base taken along line 9-9 of FIG. 6.
FIG. 10 is an exploded, perspective view of the sensor assembly.
Figure 11:
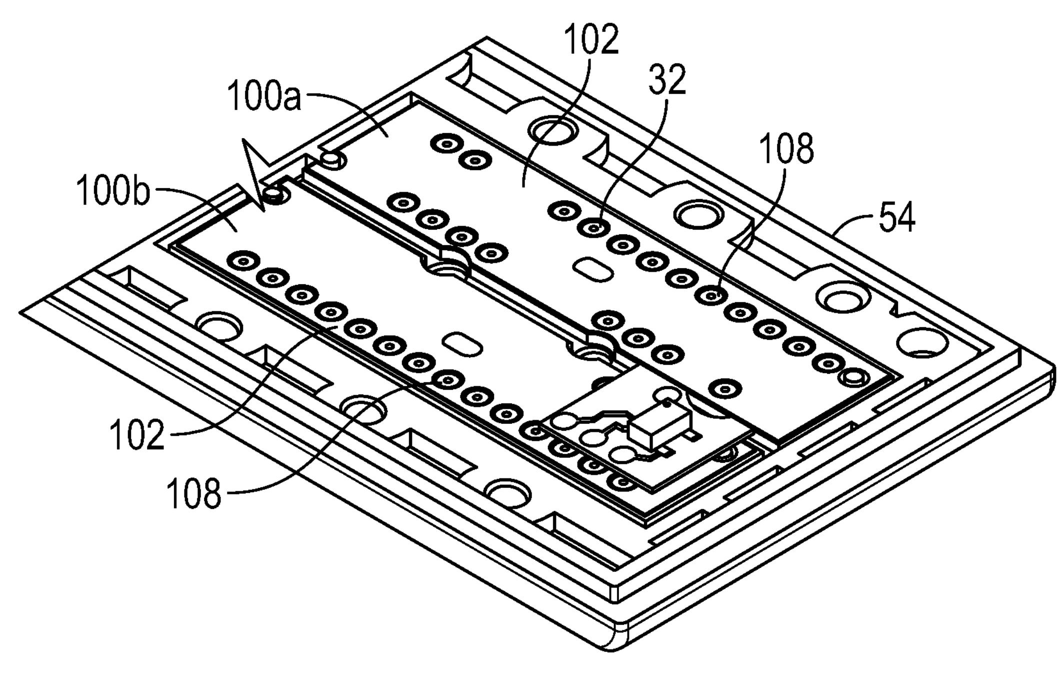
FIG. 11 is a partial perspective view of the sensor assembly with a cover removed to illustrate a pair of sensor arrays.

Referring now to FIGS. 9-11, in one non-limiting embodiment, the at least one analyte sensor 32 may be part of a pair of sensor arrays 100*a* and 100*b*. However, it should be understood to a person having ordinary skill in the art that the sensor assembly 18 may comprise any number of analyte sensor arrays. The sensor arrays 100*a* and 100*b* may be the same or different both in configuration and the electrochemical assays/measurements performed. In addition, the sensor arrays 100*a* and 100*b*, while shown in FIGS. 9 and 11 as on the top side 62 of the base 54, they may be on the same or different sides to accomplish the presently disclosed and/or claimed inventive concept(s). For instance, the sensor array 100*a* may be on the top side 62 of the base 54 and the sensor array 100*b* may be on the bottom side 64 of base 54; alternatively, both of the sensor arrays 100*a* and 100*b* may be on the bottom side 64.

An example of a suitable sensor array is disclosed in WO2020/05692 and WO2020/005697, both of which are hereby expressly incorporated herein by reference. The sensor arrays 100*a* and 100*b* may include a sensor panel 102 having an upper surface and a lower surface. In some embodiments, one or more analyte sensors 108 may be positioned on the sensor panel 102. The sensor panel 102 may be fabricated from materials including, but not limited to ceramics, plastic, and/or the like.

In some embodiments, the sensor arrays 100*a* and 100*b* may include an adhesive layer 110 having an upper surface 112 and a lower surface 114. A pair of slots 116 may span the length of the adhesive layer 110. The upper surface 112 of the adhesive layer 110 may be adhesively secured to the lower surface 106 of the sensor panel 102. The lower surface 114 of the adhesive layer 110 may be secured to the upper surface 62 of the base 54 with the slots 116 aligned with the grooves 66 and 76. In some embodiments, the adhesive layer 110 may be optional.

The sensor arrays 100*a* and 100*b* are secured over the grooves 66 and 76, respectively to define portions of the fluid flow path 48. The fluid flow path 48 is configured such that the test or fluid sample traverses along the grooves 66 and 76 for contact with one or more analyte sensors 108.

Referring now to FIGS. 3, 10, and 12-14, the cover 56 of the housing 30 is secured to the base 54 with the sensor arrays 100*a* and 100*b* sandwiched therebetween. The cover 56 has a first end 130, a second end 132, a first side 134, a second side 136, and a bottom side 138. The bottom side 138 is configured to be connected to the top side 62 of the base 54 with the sensor arrays 100*a* and 100*b* positioned therebetween and so the cover 56 defines the sensor containment space 50 adjacent the first end 130 of the cover 56. The bottom side 138 of the cover 56 may have a plurality of openings 140 corresponding with the analyte sensors 108 to permit electrical pins (not shown) to contact the analyte sensors 108.

The reference electrode containment space 52 of the housing 56 is defined adjacent the second end 132 of the cover 56 by a plurality of sidewalls 142*a*-142*d*. The sidewall 142*d* divides the sensor containment space 50 from the reference electrode containment space 52. The reference electrode containment space 52 may be enclosed with a cap 144. The cap 144 may support the reference electrode 34 (FIG. 12) such that the reference electrode 34 extends into the reference electrode containment space 52. The reference electrode 34 may be, for example, a silver chloride coated silver wire. The reference fluid 36 is disposed in the reference electrode containment space 52 such that the reference fluid 36 contacts the reference electrode 34. The reference fluid 36 may be an electrolyte solution, such as a potassium chloride solution (or some equivalent formulation).

The reference fluid 36 contacts (e.g., to form ionic and/or electrical connection with) the fluid sample of the fluid flow path 48 at a flow limiting region, such as a membrane, film, barrier, constriction, or boundary region. The reference fluid 36 forms a liquid junction 38 with the fluid sample at or near the flow limiting region. A liquid junction is a boundary between two electrolyte solutions (e.g., the reference fluid 36 and the fluid sample) of different composition, across which arises a potential difference, called a liquid junction potential. The flow limiting region may be a porous region (having one or more pores or holes) permitting the flow of ions by diffusion but limiting fluid flow to define a restricted diffusion type liquid junction. In one non-limiting embodiment, the flow limiting region includes the membrane 150 (FIGS. 13A-B and 14A-B) positioned between the reference electrode containment space 52 and the fluid flow path 48, and which defines the region of the liquid junction 38. Thus, the membrane 150 fluidically separates (i.e., limits or prevents fluid flow, but permits ion flow) the reference electrode containment space 52 from the sensor containment space 50. The membrane 150 is positioned about the projection 84 of the base 54 to cover the slot 86. The projection 84 extends up through an opening provided through the bottom side 138 of the cover 56 in the base 54. The membrane 150 may be disk shaped and secured about the projection 84 with a securement member, such as an O-ring 152.

The membrane 150 may be formed of and/or may be treated with (e.g., coated) with one or more suitable materials, such as a polymer material, for example. In one non-limiting embodiment, all or part of the membrane 150 may be a hydrophilic material. In yet another embodiment, all or part of the membrane 150 may be treated (e.g., coated) with a hydrophilic material. A membrane formed of or comprising a hydrophilic material advantageously enhances the membrane 150 to "wet-up" to its operational functionality and helps prevent bubble formation, and therefore helps maintain stability of the liquid junction at the membrane 150. Suitable nonexclusive examples of materials for the membrane 150 or the membrane coating include, for example, polypropylene, polyethylene, polyvinylchloride and modified polyvinylchloride, and any similar hydratable polymeric membrane known to those skilled in the art. Other suitable nonexclusive examples of materials may be cellulose acetate or a porous glass or ceramic or the like. Instead of homogenous membranes, heterogenous membranes may also be used. The term heterogenous membrane herein refers to a membrane formed of and/or treated (e.g., coated) with at least two different materials. In one exemplary embodiment, to enhance "wet-up," the side of the membrane 150 facing the fluid flow path 48 has higher hydrophilicity than the side of the membrane 150 facing the reference electrode containment space 52, where the side the membrane 150 facing the reference electrode containment space 52 may comprise a hydrophobic material or may comprise a material having lower hydrophilicity compared to side of the membrane 150 facing the fluid flow path 48. Alternatively, in another embodiment, the side of the membrane 150 facing the reference electrode containment space 52 has higher hydrophilicity than the side of the membrane 150 facing the fluid flow path 48.

The reference electrode containment space 52 is configured to house the reference fluid 36. The sensor assembly 18 may or may not be stored and shipped with the reference fluid 36 positioned in the reference electrode containment space 52, but in either embodiment the membrane 150 may be sealed to prevent contact with the reference fluid 36 until operationally desired. In one embodiment shown in FIG. 12, the plug assembly 58 is provided to seal the membrane 150. The plug assembly 58 may include a lever 154 (FIG. 10) pivotally connected to the cover 56, and a bladder 156 (FIG. 10) connected to one end of the lever 154. The plug 40 (FIGS. 10-13B) is connected to the other end of the lever 154. The plug 50 may be a rigid or semi-rigid cap. Actuation of the bladder 156 by an actuator (not shown) causes the lever 154 to operate the plug 40 from a closed position (FIG. 13A)—where the plug 40 seals the liquid junction 38 (e.g., the membrane 150) from the reference fluid 36—to an open position (FIG. 13B) where the reference fluid 36 is in fluid communication with the fluid flow path 48 to form the liquid junction 38 at or near the membrane 150.

In one non-limiting embodiment, the bottom side 138 of the cover 56 includes a well or pocket 160 in which the membrane 150 is positioned to control ionic diffusion. A portion of the plug 40 may mate with the pocket 160 to seal the membrane 150 from the reference fluid 36. Because of the small fluid spaces used in the sensor assembly 18, a bubble may form between the reference fluid 36 and the membrane 150 upon moving the plug 40 to the open position to expose the membrane 150 to the reference fluid 36, thereby preventing the membrane 150 from becoming "wet up" and resulting in measurement errors of the sensor assembly 18.

The wicking member 42 is configured to be in fluid communication with the reference electrode containment space 52 (such as, but not limited to, being positioned in the reference electrode containment space 52) and is arranged to contact a surface of the membrane 150. The wicking member 42 is configured to be sealed from the reference fluid 36 when the plug 40 is in the closed position, and the wicking member 42 is configured to draw the reference fluid 36 into contact with the membrane 150 when the plug 40 is in the opening position. In the open position, the wicking member 42 is configured to maintain contact of the reference fluid 36 with the membrane 150, and thus is configured to maintain the liquid junction 38.

In FIGS. 13A-13B and 14A-14B, the wicking member 42 is illustrated as being a strip positioned in the pocket 160, and where one end or surface of the wicking member 42 is in contact with the membrane 150. It will be appreciated, however, that the wicking member 42 may be constructed in a variety of shapes and sizes. Also, in one embodiment, more than one wicking member 42 may be employed. The one or more wicking members are arranged to contact at least a portion of the surface of the membrane 150 facing the reference electrode containment space 52. The wicking member 42 absorbs the reference fluid 36 and draws the reference fluid 36 to the surface of the membrane 150. By drawing the reference fluid 36 into contact with the membrane 150, the wicking member 42 helps prevent bubble formation and therefore helps maintain and/or create the liquid junction at the membrane 150, thereby reducing measurement errors. In one embodiment, the wicking member 42 is a hydrophilic material or may be coated with a hydrophilic material. Alternatively, the wicking member 42 may be formed of and/or may be coated with a combination of hydrophobic and hydrophilic materials, where the hydrophilic material portion is exposed to the reference fluid 36 during operation of the sensor assembly 18. As used herein, "wicking member" refers to any substance or material, matrix, mixture or complex having an open structure, such as an open mesh. For example, the wicking member may be formed of a woven and/or non-woven (extruded) material(s) made from filament fibers, or may be formed of a sintered material (e.g., a non-fibrous material made of a plurality of pellets such as polymer or metal pellets). Other non-limiting exemplary material may include, for example, cellulose, polyester, nylon, aramid, polyethylene, and/or glass fibers are among the many fibers available that are suitable for the applications. Suitable materials for the wicking member 42 are Hi-Flow™ Plus Membrane and SureWick® Pad Materials commercially available from EMD Millipore Corporation, Billerica, MA.

Figure 13A:
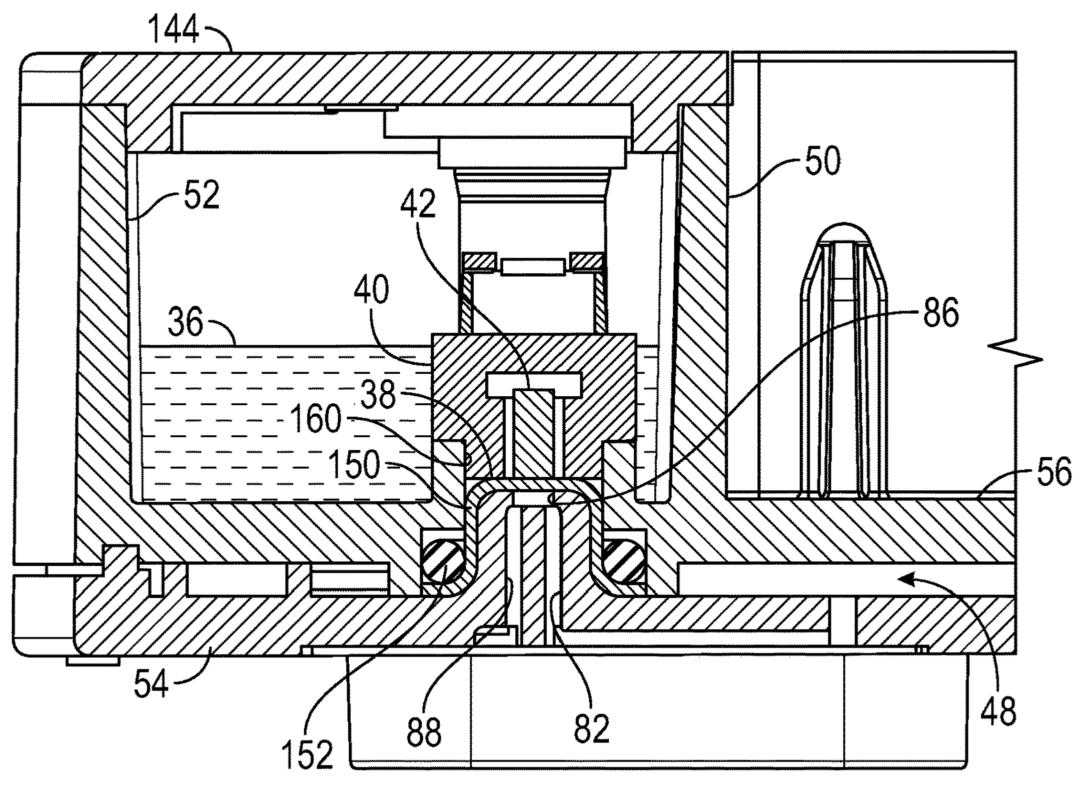
FIG. 13A is sectional view taken along line 13A-13A of FIG. 3 illustrating a seal in a closed position.
Figure 13B:
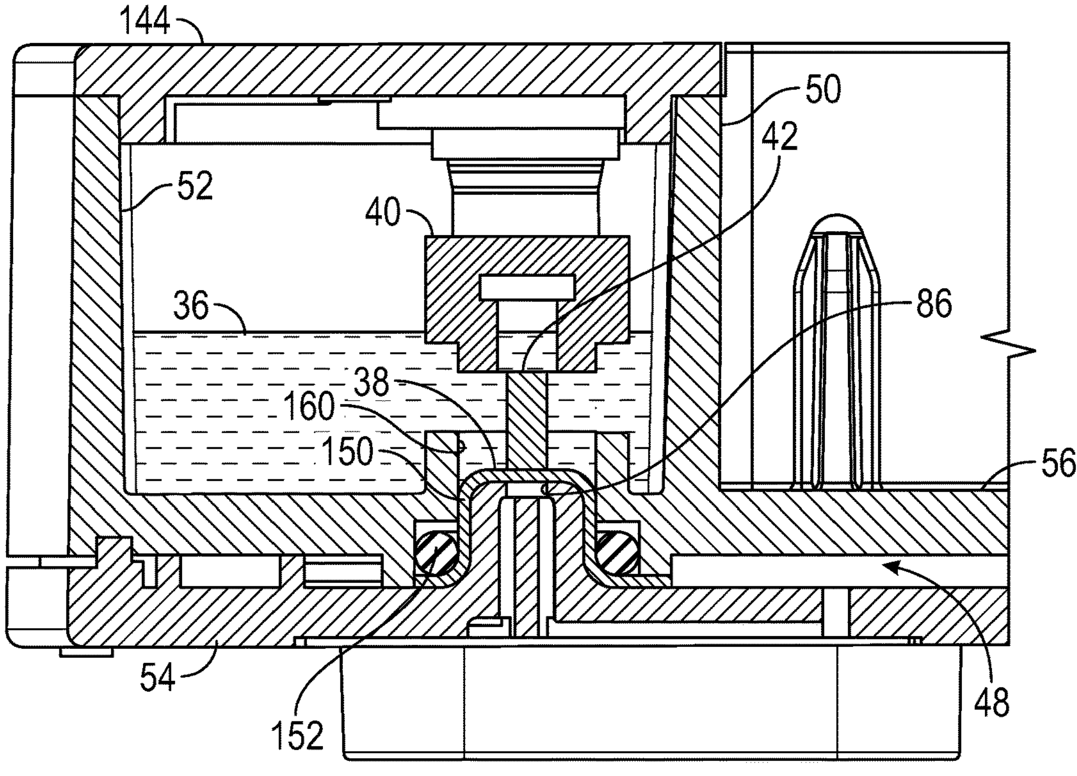
FIG. 13B is sectional view illustrating the seal of FIG. 13A in an open position.

To seal the wicking member 42 when in the closed position, the plug 40 may be hollow with an open bottom through which the wicking member 42 is positioned, as shown in FIGS. 13A-13B. The wicking member 42 may be attached to an inside of the pocket 160, such as attached to a surface of the membrane 150, with a suitable adhesive or by part interference or capture.

Figure 14A:
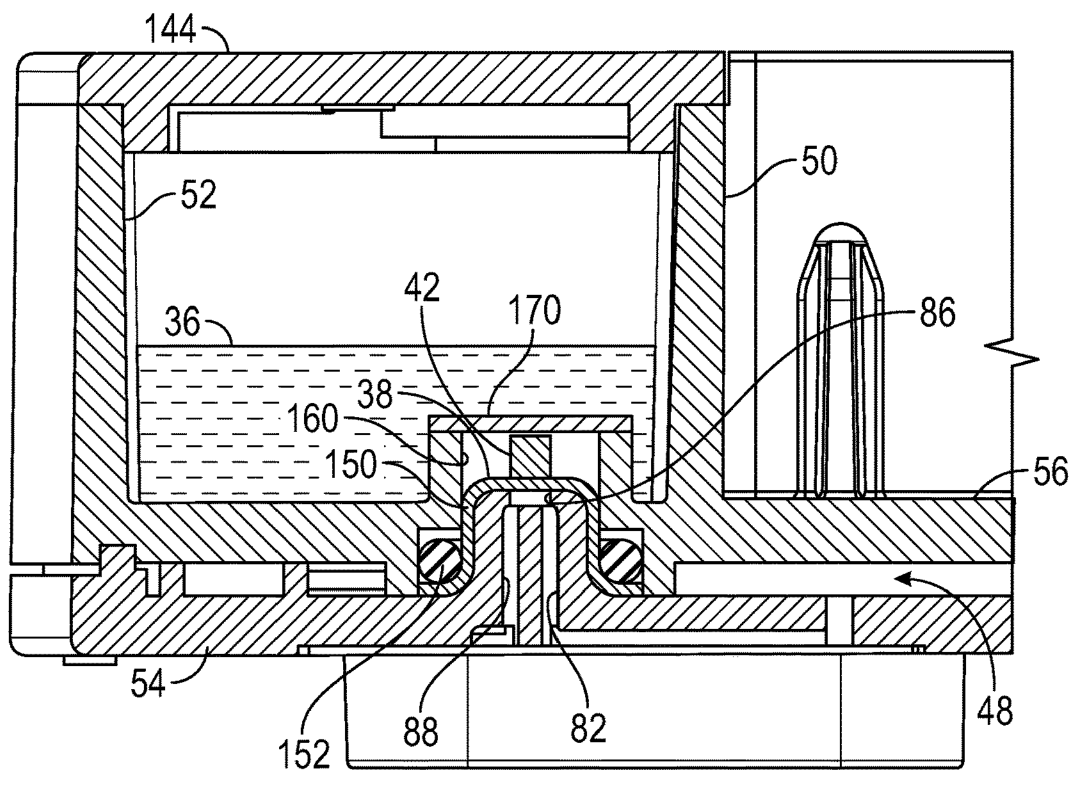
FIG. 14A is a sectional view of another embodiment of a seal illustrating the seal in a closed position.
Figure 14B:
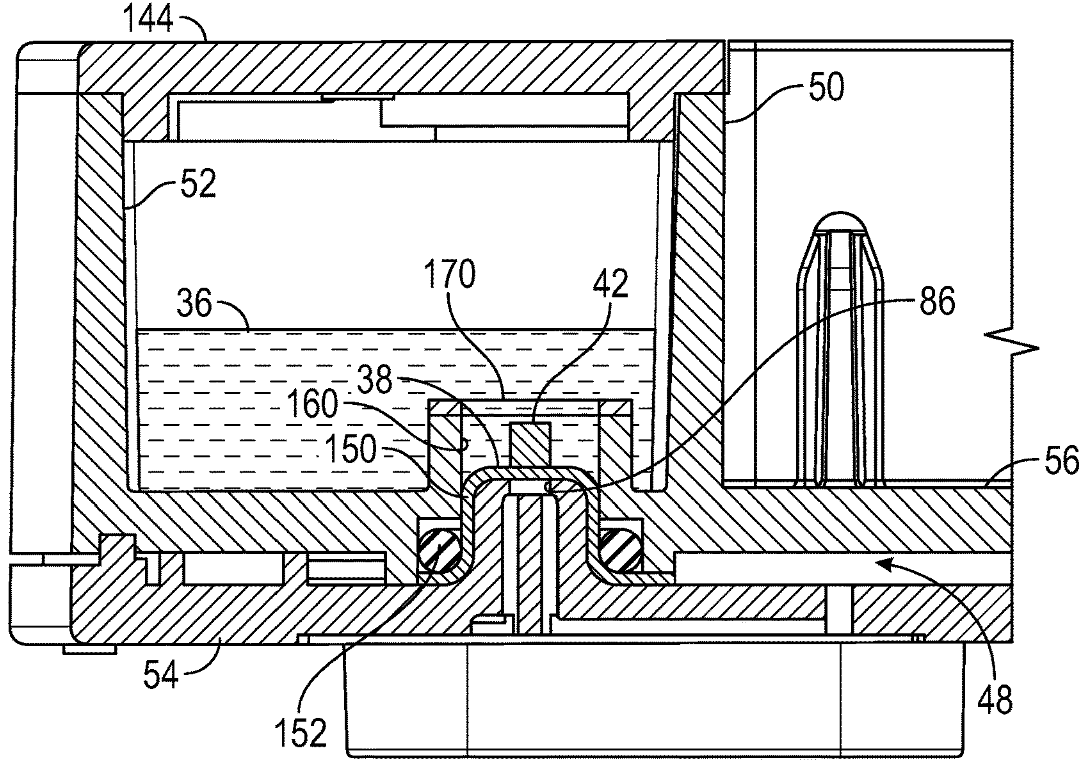
FIG. 14B is sectional view illustrating the seal of FIG. 14A in an open position.

In another embodiment shown in FIGS. 14A and 14B, instead of the plug 40 or the plug assembly 58, the seal may be a pierceable barrier 170, such as a film or coating, which may be positioned over the bottom side 138 of the cover 56 in a closed position (FIG. 14A) to seal the liquid junction 38 (e.g., membrane 150) from the reference fluid 36. In the closed position (i.e., unpierced or unbroken position), the pierceable barrier 170 is configured to sealingly separate the membrane 150 and the wicking member 42 from the reference fluid 36. In one embodiment, as shown in FIG. 14A, to seal the membrane 150 and the wicking member 42, the pierceable barrier 170 extends across the pocket 160 containing the membrane 150 and the wicking member 42. The pierceable barrier 170 may or may not be in direct contact with a surface of the wicking member 42. In one embodiment, the pierceable barrier 170 may be a hydrophobic material to further facilitate preventing the reference fluid 36 from contacting the membrane 150 and/or the wicking member 42 when the pierceable barrier 170 is in the closed position.

When the sensor assembly 18 is activated, the pierceable barrier 170 (e.g., film or coating) may be broken or pierced so the pierceable barrier 170 is in an open position (FIG. 14B). The pierceable barrier 170 may be broken or pierced by a tearing or puncturing of the pierceable barrier 170 to form the liquid junction 38 where the reference fluid 36 is in fluid communication with the fluid flow path 48. In one exemplary embodiment, the pierceable barrier 170 may be broken or pierced by a mechanical piercer (not shown), such as a piercing or puncturing element attached to the housing 30 and configured to be actuated or moved (e.g., by a user or actuator) toward the pierceable barrier 170 when the sensor assembly 18 is activated. Alternatively, or in addition, the pierceable barrier 170 may be broken or pierced by, for example, an electrical piercer, such as a spark, shock, or vibration (e.g., ultrasound) signal which is configured to cause the pierceable barrier 170 to break and expose the membrane 150 to the reference fluid 36 when the sensor assembly 18 is activated. Accordingly, piercing or breaking of the pierceable barrier 170 by a tearing or puncturing element (not shown) exposes the wicking member 42 to the reference fluid 36, which in turn facilitates drawing of the reference fluid 36 to the membrane 150 for enhanced "wet-up" and reduced bubble formation.

Figure 15A:
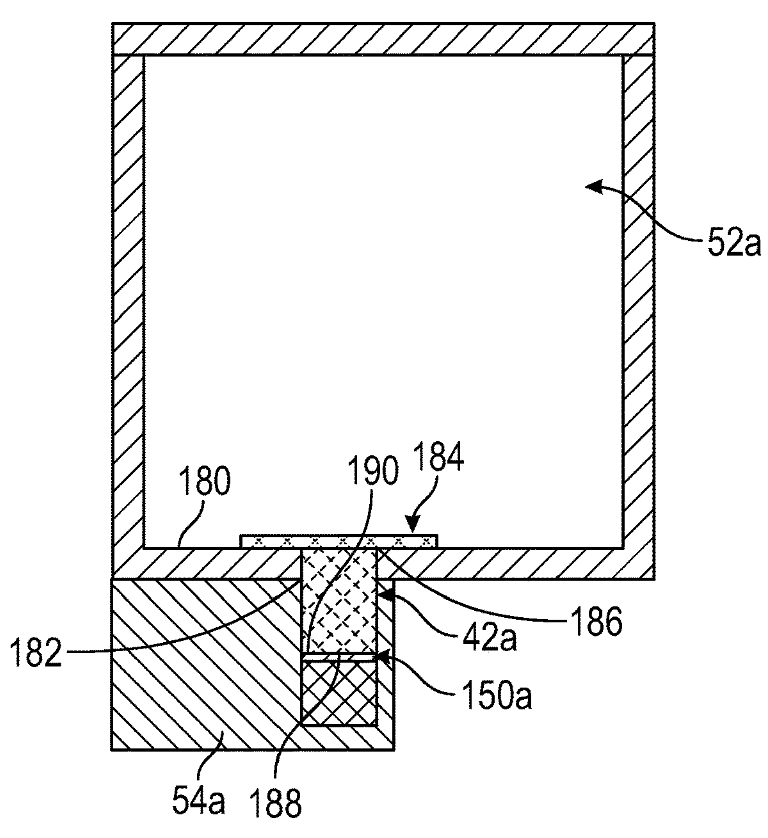
FIG. 15A is a sectional view of another embodiment of another reference electrode containment space, seal, wicking member, and membrane assembly constructed in accordance with the present disclosure.

In the embodiments shown in FIGS. 13A-B and 14A-B, the wicking member 42 and the membrane 150 are positioned inside the reference electrode containment space 52. However, what is important is that one portion of the wicking member 42 is arranged to contact a portion of the membrane 150, and that the wicking member 42 and the membrane 150 are configured to be sealed by a seal (e.g., a plug or pierceable barrier) to prevent fluidic communication or contact with the reference fluid 36 contained in the reference electrode containment space 52 until operationally desired. Accordingly, it is within the scope of the present disclosure for the wicking member and the membrane to be positioned outside or external to the interior of the reference electrode containment space, as shown in FIGS. 15A-15D. In one alternative embodiment, as shown in FIG. 15A, a portion of a wall 180 of a reference electrode containment space 52*a* (e.g., a portion of a bottom wall 180) has a gap or opening 182 that is covered with a seal 184 (e.g., a plug or pierceable barrier). A first end 186 or surface of a wicking member 42*a* is positioned in the gap 182 or otherwise configured to be in contact with the seal 184 extending across the gap 182. The wicking member 42*a* extends from its first end 186 away from the reference electrode containment space 52*a* (e.g., away from the bottom wall 180 of the reference electrode containment space 52*a*) towards a second end 188 or surface of the wicking member 42*a* that is opposite the first end 184. The second end 188 of the wicking member 42*a* is arranged to contact at least a portion of a surface 190 of a membrane 150*a* facing the reference electrode containment space 52*a*. In this embodiment, the seal 184 (e.g., the plug or pierceable barrier) may be similar to that of the plug 40 and pierceable barrier 170 of FIGS. 13A-13B and 14A-14B, except that the seal 184 is configured to seal the gap 182 or opening in a portion of the wall 180 of the reference electrode containment space 52*a* (e.g., the portion of the bottom wall 180) when in the closed position, and configured to expose the gap 182 and hence expose the wicking member 42*a* positioned therein and draw the reference fluid into contact with the membrane 150*a* when the seal 184 (e.g., plug or pierceable barrier) is in the open position.

In FIG. 15A, the wicking member 42*a* extends into the gap 182 in the wall 180 of the reference electrode containment space 52*a* such that the first end 186 of the wicking member 42*a* is substantially planar with an interior surface of the wall 180 of the reference electrode containment space 52*a*, and then the wicking member 42*a* within the gap 182 is covered by the seal 184 that is within the reference electrode containment space 52*a*. However, it will be understood that the scope of the present disclosure includes positioning the wicking member and the seal at any location inside, internal, external, or outside of the interior of the reference electrode containment space.

Figure 15B:
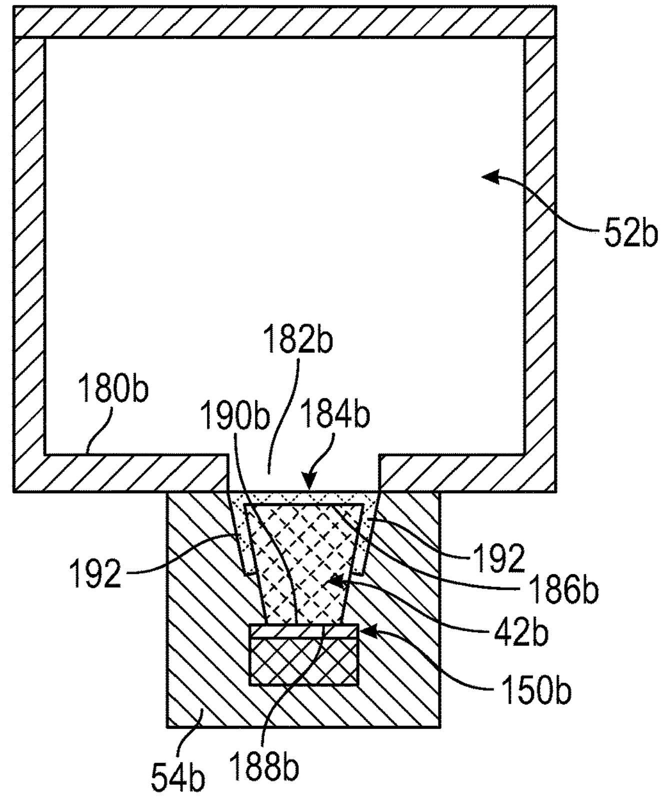
FIG. 15B is a sectional view of yet another embodiment of another reference electrode containment space, seal, wicking member, and membrane assembly constructed in accordance with the present disclosure.

Alternatively to the seal extending across the gap of the bottom wall of the reference electrode containment space, the seal may be arranged to seal a mating member coupled to or extending though the gap until operationally desired. The mating member may be a well or pocket in which at least a portion (e.g., first end of) the wicking member is positioned therein, and where the seal may mate with the mating member (e.g., a top surface of the well or pocket) to seal the wicking member and the membrane from fluidic communication with the reference fluid until the seal is opened. The mating member may be similar in design and function to the well or pocket 160 described in FIGS. 13A-B and 14A-B, except that at least a portion of the mating member is positioned external to the reference electrode containment space and is aligned with the gap in the wall of the reference electrode containment space In one non-limiting embodiment (FIG. 15B), the mating member (e.g., well of pocket) may be coupled to the exterior wall of the reference electrode containment space and extend away from the interior of the reference electrode containment space, and where the seal is configured to extend across the gap along the exterior wall of the reference electrode containment space. As can be seen in FIG. 15B, the wicking member 42*b* is positioned outside and external to the reference electrode containment space 52*b*. The seal 184*b* is disposed over the first end 186*b* of the wicking member 42*b* and covers the gap/opening 182*b* in the wall 180*b* of the reference electrode containment space 52*b*. A mating member 192 extends downward (i.e., away from the reference electrode containment space 52*b*) from the sides of the first end 186*b* of the wicking member 42*b* and about at least a portion of the sides thereof such that at least a portion of the wicking member 42*b* (i.e., the first end 186*b*) is positioned within the mating member 192 (i.e., within the side walls of the mating member 192). The seal 184*b* is arranged to extend across the side walls of the mating member 192 such that the first end 186*b* of the wicking member 42*b* and the gap/opening 182*b* are sealed in the closed position when fluidic communication between the reference electrode containment space 52*b* and the wicking member 42*b* are not desired.

Figure 15C:
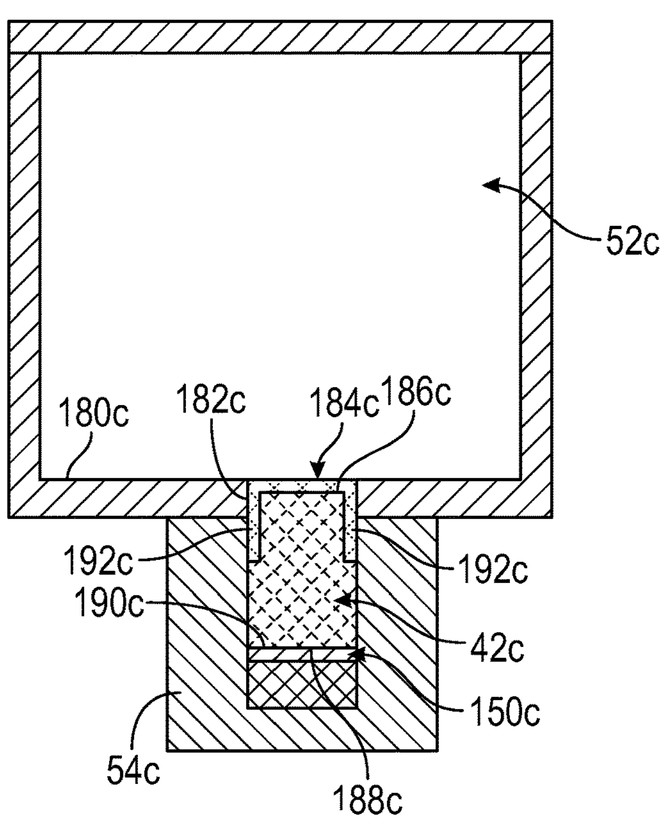
FIG. 15C is a sectional view of yet another embodiment of another reference electrode containment space, seal, wicking member, and membrane assembly constructed in accordance with the present disclosure.
Figure 15D:
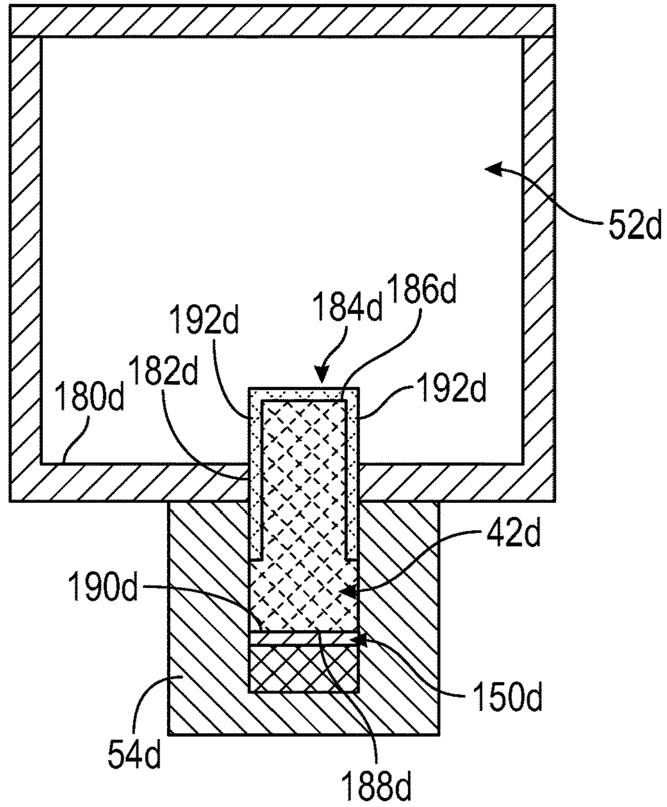
FIG. 15D is a sectional view of yet another embodiment of another reference electrode containment space, seal, wicking member, and membrane assembly constructed in accordance with the present disclosure.

In another non-limiting embodiment (FIG. 15C), the mating member (e.g., well of pocket) is positioned flush with the wall of the reference electrode containment space and extends from the gap towards the exterior of the reference electrode containment space, and where the seal is flush or aligned with the interior of the bottom wall of the reference electrode containment space. In FIG. 15C, the wicking member 42*c* is disposed in the gap 182*c* such that the first end 186*c* of the wicking member 42*c* is disposed in the interior of the wall 180*c*. In addition, the seal 184*c* covers the first end 186*c* of the wicking member 42*c* and the mating member 192*c* extends down the sides thereof so as to plug the gap/opening 182*c* in the wall 180*c* of the reference electrode containment space 52*c*.

In yet another embodiment (FIG. 15D), the mating member (e.g., well of pocket) is positioned to extend through the gap such that a first end of the mating member is positioned inside the reference electrode containment space and a second end of the mating member is positioned outside the reference electrode containment space. In this embodiment, the wicking member may be positioned both inside and outside the referenced electrode containment space, such that the first end of the wicking member is arranged inside the reference electrode containment space and capable of being in contact with the seal, while the second end of the wicking member is arranged outside the reference electrode containment space and is in contact with the membrane. In particular, in FIG. 15D, the wicking member 42*c* extends through the gap 182*d* in the wall 180*d* of the reference electrode containment space 52*d* and into the interior thereof. The seal 184*d* covers the first end 186*d* of the wicking member 42*d* and the mating member 192*d* covers at least the portion of the sides of the wicking member 42*d* that extends through the wall 180*d* of the reference electrode containment space 52*d*. In all of FIGS. 15A-D, the second end 188/188*b*/188*c*/188*d* of the wicking member 42*a*/42*b*/42*c*/42*d*, as well as the membrane 150*a*/150*b*/150*c*/150*d*, are external to the reference electrode containment space 52*a*/52*b*/52*c*/52*d*.

In use, the sensor assembly 18 is inserted into and secured within the enclosure 12. The seal (e.g., the plug 40, the pierceable barrier 170, or the seal 184) is moved or actuated from the closed position to the open position to expose the wicking member 42 and the membrane 150 to the reference fluid 36 so the membrane is "wet up." The wicking member 42 assists and enhances the "wet-up" of the membrane 150 for improved operation of the sensor assembly 18. For example, the wicking member 42 enhances the "wet-up" cycle of the sensor assembly 18 and reduces or prevents bubble formation over the membrane 150 because the wicking member 42 draws the reference fluid 36 towards the membrane 150 and/or pocket 160, thereby improving complete fluid coverage of the areas surrounding the membrane 150 and/or pocket 160 which helps to prevent bubble formation, as well as to push any formed bubbles away from the membrane 150, thus improving "wet-up" of the membrane 150. Because the wicking member 42 draws the reference fluid 36 towards the membrane 150, the wicking member 42 advantageously facilitates and maintains contact of the reference fluid 36 with the membrane 150, thereby improving the creation and maintenance of the liquid junction 38 in the open position. The presence of the wicking member 42 may reduce or prevent the formation of bubbles over the membrane 150 during the testing cycle of the sensor assembly 18 due to the hydrophilic nature of the wicking member 150 material. The wicking member 42 may also reduce or prevent the formation of bubbles due to the exclusion and/or reduction of convective fluid motion over the membrane 150, where convective fluid motion could disadvantageously introduce gas (hence bubbles) as the reference fluid 36 heats up (e.g., to 37° C.) during the testing cycle. Heating of the reference fluid 36 changes (i.e., decreases) the gas solubility and may lead to the evolution of gases (e.g., oxygen and nitrogen) from the reference fluid 36, thereby disadvantageously prompting the formation of gas bubbles at or near the membrane 150. After a predetermined number of tests of the fluid sample, the sensor assembly 18 may be removed from the enclosure 12 as a modular unit.

EXAMPLES

The following examples serve to illustrate certain useful embodiments and aspects of the presently disclosed and claimed inventive concepts and are not to be construed as limiting the scope thereof.

Example 1

Four sensor cartridges without wicking members were tested. Each of the sensor assemblies demonstrated wet-up failure. Each of the sensor assemblies formed bubbles over the membrane within twenty-four hours. The potentiometric signals appeared to start to drift and finally registered readings that indicated loss of the reference.

Example 2

Three sensor assemblies, each provided with a wicking member, were tested. None of the sensor assemblies failed during initial wet-up, and none of the sensor assemblies failed during a one week run period. In this example, a cellulose wicking material was used as the wicking member. However, it should be understood that any material having wicking properties may be used as the wicking member, as described above.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

Non-Limiting Illustrative Embodiments

The following is a list of non-limiting illustrative embodiments of the inventive concepts disclosed herein:

An illustrative sensor assembly for a bodily fluid analyzer, comprising: a reference electrode container containing a reference electrode, wherein the reference electrode container is configured to house a reference fluid; a membrane configured to be in fluid communication with the reference electrode container; and a wicking member configured to be in fluid communication with the reference electrode container, wherein the wicking member is configured to draw the reference fluid towards the membrane when the membrane and the wicking member are exposed to the reference fluid.

The illustrative sensor assembly of any one of the preceding illustrative embodiments, wherein the wicking member is in contact with the membrane.

The illustrative sensor assembly of any one of the preceding illustrative embodiments, wherein the wicking member comprises a hydrophilic material.

The illustrative sensor assembly of any one of the preceding illustrative embodiments, further comprising a seal positioned in the reference electrode container and operable from a closed position to an open position, in the closed position the wicking member and the membrane are sealed from the reference fluid, and in the open position the wicking member and the membrane are exposed to the reference fluid.

The illustrative sensor assembly of any one of the preceding illustrative embodiments, wherein the seal is a plug.

The illustrative sensor assembly of any one of the preceding illustrative embodiments, wherein the reference electrode container has a pocket, wherein the plug mates with the pocket in the closed position, and wherein the wicking member is positioned in the pocket between the plug and the membrane.

The illustrative sensor assembly of any one of the preceding illustrative embodiments, wherein the seal is a pierceable barrier configured to be pierced.

The illustrative sensor assembly of any one of the preceding illustrative embodiments, wherein the reference electrode container has a pocket, wherein the pierceable barrier covers the pocket in the closed position, and wherein the wicking member is positioned in the pocket between the pierceable barrier and the membrane.

The illustrative sensor assembly of any one of the preceding illustrative embodiments, wherein the membrane and/or the wicking member are positioned inside the reference electrode container.

The illustrative sensor assembly of any one of the preceding illustrative embodiments, wherein the membrane and/or wicking member are positioned outside the reference electrode container.

The illustrative sensor assembly of any one of the preceding illustrative embodiments, wherein a first end of the wicking member is positioned inside the reference electrode container and a second end of the wicking member is positioned outside the reference electrode container, and wherein the second end of the wicking member is in contact with the membrane, the membrane being positioned outside the reference electrode container.

The illustrative sensor assembly of any one of the preceding illustrative embodiments, further comprising: a housing having a fluid inlet, a fluid outlet, and a fluid flow path extending between the fluid inlet and the fluid outlet and configured to transport a sample fluid, the housing including the reference electrode container and a sensor container fluidically separated from the reference electrode container by the membrane, wherein one side of the membrane faces the reference electrode container and another side of the membrane faces the fluid flow path.

The illustrative sensor assembly of any one of the preceding illustrative embodiments, further comprising at least one analyte sensor positioned in the sensor container in fluid communication with the fluid flow path.

The illustrative sensor assembly of any one of the preceding illustrative embodiments, wherein the membrane includes at least one pore, and wherein the wicking member is configured to maintain a liquid junction at the membrane when exposed to the reference fluid.

An illustrative fluid analyzer, comprising: a sample receiving assembly having a sample probe with a fluid inlet and a fluid outlet; a fluid waste assembly; and a sensor assembly in fluid communication with the sample receiving assembly and the fluid waste assembly, the sensor assembly comprising: a reference electrode container containing a reference electrode, wherein the reference electrode container is configured to house a reference fluid; a membrane configured to be in fluid communication with the reference electrode container; and a wicking member configured to be in fluid communication with the reference electrode container, wherein the wicking member is configured to draw the reference fluid towards the membrane when the membrane and the wicking member are exposed to the reference fluid.

The illustrative fluid analyzer of any one of the preceding illustrative embodiments, wherein the wicking member is in contact with the membrane.

The illustrative fluid analyzer of any one of the preceding illustrative embodiments, wherein the wicking member comprises a hydrophilic material.

The illustrative fluid analyzer of any one of the preceding illustrative embodiments, wherein the sensor assembly further comprises a seal positioned in the reference electrode container and operable from a closed position to an open position, in the closed position the wicking member and the membrane are sealed from the reference fluid, and in the open position the wicking member and the membrane are exposed to the reference fluid.

The illustrative fluid analyzer of any one of the preceding illustrative embodiments, wherein the seal is a plug.

The illustrative fluid analyzer of any one of the preceding illustrative embodiments, wherein the reference electrode container has a pocket, wherein the plug mates with the pocket in the closed position, and wherein the wicking member is positioned in the pocket between the plug and the membrane.

The illustrative fluid analyzer of any one of the preceding illustrative embodiments, wherein the seal is a pierceable barrier configured to be pierced.

The illustrative fluid analyzer of any one of the preceding illustrative embodiments, wherein the reference electrode container has a pocket, wherein the pierceable barrier covers the pocket in the closed position, and wherein the wicking member is positioned in the pocket between the pierceable barrier and the membrane.

The illustrative fluid analyzer of any one of the preceding illustrative embodiments, wherein the membrane and/or wicking member are positioned inside the reference electrode container.

The illustrative fluid analyzer of any one of the preceding illustrative embodiments, wherein the membrane and/or wicking member are positioned outside the reference electrode container.

The illustrative fluid analyzer of any one of the preceding illustrative embodiments, wherein a first end of the wicking member is positioned inside the reference electrode container and a second end of the wicking member is positioned outside the reference electrode container, and wherein the second end of the wicking member is in contact with the membrane, the membrane being positioned outside the reference electrode container.

The illustrative fluid analyzer of any one of the preceding illustrative embodiments, wherein the sensor assembly further comprises: a housing having a fluid inlet, a fluid outlet, and a fluid flow path extending between the fluid inlet and the fluid outlet and configured to transport a sample fluid, the housing including the reference electrode container and a sensor container fluidically separated from the reference electrode container by the membrane, wherein one side of the membrane faces the reference electrode container and another side of the membrane faces the fluid flow path.

The illustrative fluid analyzer of any one of the preceding illustrative embodiments, wherein the sensor assembly further comprises at least one analyte sensor positioned in the sensor container in fluid communication with the fluid flow path.

The illustrative fluid analyzer of any one of the preceding illustrative embodiments, wherein the membrane includes at least one pore, and wherein the wicking member is configured to maintain a liquid junction at the membrane when exposed to the reference fluid.

An illustrative method of forming a sensor assembly for a bodily fluid analyzer, comprising: positioning a membrane for being capable of fluid communication with a reference electrode container, the reference electrode container containing a reference electrode and configured to contain a reference fluid; and positioning a wicking member to draw the reference fluid towards the membrane when the membrane and the wicking member are exposed to the reference fluid.

The illustrative method of any one of the preceding illustrative embodiments, wherein the step of positioning the wicking member further comprises contacting the wicking member with the membrane.

The illustrative method of any one of the preceding illustrative embodiments, further comprises sealing the membrane and the wicking member from the reference fluid prior to positioning the reference fluid in the reference electrode container.

The illustrative method of any one of the preceding illustrative embodiments, wherein the sealing step further comprises sealing the membrane and the wicking member with a plug operable from a closed position to an open position, in the closed position the wicking member and the membrane are sealed from the reference fluid, and in the open position the wicking member and the membrane are exposed to the reference fluid when the reference electrode container contains the reference fluid.

The illustrative method of any one of the preceding illustrative embodiments, wherein the step of positioning the membrane and the wicking member further comprises positioning the membrane and the wicking member in a pocket of the reference electrode container.

The illustrative method of any one of the preceding illustrative embodiments, wherein the sealing step further comprises mating the plug with the pocket so the wicking member is positioned in the pocket between the plug and the membrane.

The illustrative method of any one of the preceding illustrative embodiments, wherein the sealing step further comprises sealing the membrane and the wicking member with a pierceable barrier operable from a closed position to an open position, in the closed position the wicking member and the membrane are sealed from the reference fluid, and in the open position the wicking member and the membrane are exposed to the reference fluid when the reference electrode container contains the reference fluid.

The illustrative method of any one of the preceding illustrative embodiments, wherein the step of positioning the membrane and the wicking member further comprises positioning the membrane and the wicking member in a pocket of the reference electrode container.

The illustrative method of any one of the preceding illustrative embodiments, wherein the sealing step further comprises covering the pocket with the pierceable barrier so the wicking member is positioned in the pocket between the pierceable barrier and the membrane.

The illustrative method of any one of the preceding illustrative embodiments, wherein the membrane and/or the wicking member are positioned inside the reference electrode container.

The illustrative method of any one of the preceding illustrative embodiments, wherein the membrane and/or wicking member are positioned outside the reference electrode container.

The illustrative method of any one of the preceding illustrative embodiments, wherein a first end of the wicking member is positioned inside the reference electrode container and a second end of the wicking member is positioned outside the reference electrode container, and wherein the second end of the wicking member is in contact with the membrane, the membrane being positioned outside the reference electrode container.

The illustrative method of any one of the preceding illustrative embodiments, wherein the reference electrode container is defined by a housing having a fluid inlet, a fluid outlet, and a fluid flow path extending between the fluid inlet and the fluid outlet and configured to transport a sample fluid, the housing further including a sensor container fluidically separated from the reference electrode container by the membrane, and wherein the step of positioning the membrane in the reference electrode container further comprises positioning the membrane so one side of the membrane faces reference electrode container and another side of the membrane faces the fluid flow path.

The illustrative method of any one of the preceding illustrative embodiments, further comprising positioning at least one analyte sensor in the sensor container in fluid communication with the fluid flow path.

The illustrative method of any one of the preceding illustrative embodiments, wherein the step of positioning the membrane further comprises the membrane including at least one pore, and wherein the wicking member maintains a liquid junction at the membrane when exposed to the reference fluid.

What is claimed is:

1. A sensor assembly for a bodily fluid analyzer, comprising:

- a reference electrode container containing a reference electrode, wherein the reference electrode container is configured to house a reference fluid;
- a membrane configured to be in fluid communication with the reference electrode container; and
- a wicking member configured to be in fluid communication with the reference electrode container, wherein the wicking member is configured to draw the reference fluid towards the membrane when the membrane and the wicking member are exposed to the reference fluid.

2. The sensor assembly of claim 1, wherein the wicking member is in contact with the membrane.

3. The sensor assembly of claim 1, wherein the wicking member comprises a hydrophilic material.

4. The sensor assembly according to claim 1, further comprising:

- a seal positioned in the reference electrode container and operable from a closed position to an open position, in the closed position the wicking member and the membrane are sealed from the reference fluid, and in the open position the wicking member and the membrane are exposed to the reference fluid.

5. The sensor assembly of claim 4, wherein the seal is a plug.

6. The sensor assembly of claim 5, wherein the reference electrode container has a pocket, wherein the plug mates with the pocket in the closed position, and wherein the wicking member is positioned in the pocket between the plug and the membrane.

7. The sensor assembly of claim 4, wherein the seal is a pierceable barrier configured to be pierced.

8. The sensor assembly of claim 7, wherein the reference electrode container has a pocket, wherein the pierceable barrier covers the pocket in the closed position, and wherein the wicking member is positioned in the pocket between the pierceable barrier and the membrane.

9. The sensor assembly according to claim 1, wherein the membrane and the wicking member are positioned inside the reference electrode container.

10. The sensor assembly according to claim 1, wherein the membrane and the wicking member are positioned outside the reference electrode container.

11. The sensor assembly according to claim 1, wherein a first end of the wicking member is positioned inside the reference electrode container and a second end of the wicking member is positioned outside the reference electrode container, and wherein the second end of the wicking member is in contact with the membrane, the membrane being positioned outside the reference electrode container.

12. The sensor assembly according to claim 1, further comprising:

a housing having a fluid inlet, a fluid outlet, and a fluid flow path extending between the fluid inlet and the fluid outlet and configured to transport a sample fluid, the housing including the reference electrode container and a sensor container fluidically separated from the reference electrode container by the membrane, wherein one side of the membrane faces the reference electrode container and another side of the membrane faces the fluid flow path.

13. The sensor assembly of claim 12, further comprising at least one analyte sensor positioned in the sensor container in fluid communication with the fluid flow path.

14. The sensor assembly according to claim 1, wherein the membrane includes at least one pore, and wherein the wicking member is configured to maintain a liquid junction at the membrane when exposed to the reference fluid.

15. A fluid analyzer, comprising:

a sample receiving assembly having a sample probe with a fluid inlet and a fluid outlet;

a fluid waste assembly; and a sensor assembly in fluid communication with the sample receiving assembly and the fluid waste assembly, the sensor assembly comprising:

a reference electrode container containing a reference electrode, wherein the reference electrode container is configured to house a reference fluid;

a membrane configured to be in fluid communication with the reference electrode container; and a wicking member configured to be in fluid communication with the reference electrode container, wherein the wicking member is configured to draw the reference fluid towards the membrane when the membrane and the wicking member are exposed to the reference fluid.

16. The fluid analyzer of claim 15, wherein the wicking member is in contact with the membrane.

17. The fluid analyzer of claim 15, wherein the wicking member comprises a hydrophilic material.

18. The fluid analyzer according to claim 15, wherein the sensor assembly further comprises:

a seal positioned in the reference electrode container and operable from a closed position to an open position, in the closed position the wicking member and the membrane are sealed from the reference fluid, and in the open position the wicking member and the membrane are exposed to the reference fluid.

19. The fluid analyzer of claim 18, wherein the seal is a plug.

20. The fluid analyzer of claim 19, wherein the reference electrode container has a pocket, wherein the plug mates with the pocket in the closed position, and wherein the wicking member is positioned in the pocket between the plug and the membrane.

21. The fluid analyzer of claim 18, wherein the seal is a pierceable barrier configured to be pierced.

22. The fluid analyzer of claim 21, wherein the reference electrode container has a pocket, wherein the pierceable barrier covers the pocket in the closed position, and wherein the wicking member is positioned in the pocket between the pierceable barrier and the membrane.

23. The fluid analyzer according to claim 15, wherein the membrane and the wicking member are positioned inside the reference electrode container.

24. The fluid analyzer according to claim 15, wherein the membrane and the wicking member are positioned outside the reference electrode container.

25. The fluid analyzer according to claim 15, wherein a first end of the wicking member is positioned inside the reference electrode container and a second end of the wicking member is positioned outside the reference electrode container, and wherein the second end of the wicking member is in contact with the membrane, the membrane being positioned outside the reference electrode container.

26. The fluid analyzer according to claim 15, wherein the sensor assembly further comprises:

a housing having a fluid inlet, a fluid outlet, and a fluid flow path extending between the fluid inlet and the fluid outlet and configured to transport a sample fluid, the housing including the reference electrode container and a sensor container fluidically separated from the reference electrode container by the membrane, wherein one side of the membrane faces the reference electrode container and another side of the membrane faces the fluid flow path.

27. The fluid analyzer of claim 25, wherein the sensor assembly further comprises at least one analyte sensor positioned in the sensor container in fluid communication with the fluid flow path.

28. The fluid analyzer according to claim 15, wherein the membrane includes at least one pore, and wherein the wicking member is configured to maintain a liquid junction at the membrane when exposed to the reference fluid.

* * * * *